United States Patent
Ferrabee et al.

(10) Patent No.: US 12,201,888 B2
(45) Date of Patent: Jan. 21, 2025

(54) METHOD AND SYSTEM OF REPLICATING BALL TRAJECTORIES USING AN AUTOMATED BALL THROWING MACHINE

(71) Applicant: TRAJEKT SPORTS INC., Mississauga (CA)

(72) Inventors: Rowan William Ferrabee, Ottawa (CA); Joshua Scott Pope, Toronto (CA); Robert Wilson Rowland, Tottenham (CA)

(73) Assignee: TRAJEKT SPORTS INC., Mississauga (CA)

( * ) Notice: Subject to any disclaimer, the term of this patent is extended or adjusted under 35 U.S.C. 154(b) by 42 days.

(21) Appl. No.: 17/606,809

(22) PCT Filed: Sep. 17, 2020

(86) PCT No.: PCT/CA2020/051246
§ 371 (c)(1),
(2) Date: Oct. 27, 2021

(87) PCT Pub. No.: WO2021/051196
PCT Pub. Date: Mar. 25, 2021

(65) Prior Publication Data
US 2022/0233942 A1    Jul. 28, 2022

Related U.S. Application Data

(60) Provisional application No. 62/901,879, filed on Sep. 18, 2019.

(51) Int. Cl.
A63B 71/06    (2006.01)
A63B 24/00    (2006.01)
(Continued)

(52) U.S. Cl.
CPC .. *A63B 71/0619* (2013.01); *A63B 2024/0034* (2013.01); *A63B 2069/0008* (2013.01);
(Continued)

(58) Field of Classification Search
CPC ............. A63B 71/0619; A63B 69/406; A63B 2024/0034; A63B 2069/0008;
(Continued)

(56) References Cited

U.S. PATENT DOCUMENTS 4,442,823 A * 4/1984 Floyd .................. A63B 69/406
124/78
6,880,542 B1    4/2005 Johndreus et al.
(Continued)

FOREIGN PATENT DOCUMENTS

| JP | 2002-239052 A | 8/2002 |
| JP | 2006-61231 A | 3/2006 |
| WO | 2021156660 A1 | 8/2021 |

OTHER PUBLICATIONS

The European Search Report for the corresponding European Application No. 20866189.2 dated Sep. 20, 2023.
(Continued)

*Primary Examiner* — William H McCulloch, Jr.
*Assistant Examiner* — Ankit B Doshi
(74) *Attorney, Agent, or Firm* — Gowling WLG (Canada) LLP

(57) ABSTRACT

The disclosure is directed at a system and method of automated object launching, for replicating ball trajectories, for example with a baseball. The system receives an input from a user that includes trajectory information and then
(Continued)

launches an object based on that trajectory. The system includes subsystems that control the orientation of the object to be launched and the position of the system itself. The system also includes a results tracking database to provide analytics and the like for the user.

18 Claims, 28 Drawing Sheets

(51) Int. Cl.
  *A63B 69/00* (2006.01)
  *A63B 69/40* (2006.01)
(52) U.S. Cl.
  CPC ....... *A63B 2069/402* (2013.01); *A63B 69/406* (2013.01); *A63B 2220/05* (2013.01); *A63B 2220/30* (2013.01); *A63B 2220/806* (2013.01); *A63B 2220/807* (2013.01); *A63B 2220/833* (2013.01); *A63B 2225/02* (2013.01); *G06T 2207/30241* (2013.01)
(58) Field of Classification Search
  CPC .......... A63B 2069/402; A63B 2220/05; A63B 2220/30; A63B 2220/806; A63B 2220/807; A63B 2220/833; A63B 2225/02; G06T 2207/30241
  See application file for complete search history.

(56) References Cited

U.S. PATENT DOCUMENTS

| | | | | |
|---|---|---|---|---|
| 7,691,012 | B2* | 4/2010 | Cucjen | A63B 69/406 |
| | | | | 124/78 |
| 9,010,309 | B2* | 4/2015 | Lewis | A63B 69/40 |
| | | | | 124/78 |
| 9,452,339 | B1* | 9/2016 | Shah | F41B 4/00 |
| 9,555,306 | B2* | 1/2017 | Lewis | A63B 71/0619 |
| 10,471,330 | B1* | 11/2019 | Hart | A63B 69/406 |
| 11,471,741 | B2* | 10/2022 | Abdelmoneum | A63B 24/0062 |
| 11,577,139 | B1* | 2/2023 | Campbell | A63B 69/407 |
| 11,657,906 | B2* | 5/2023 | Lewis | A63B 24/0075 |
| | | | | 124/78 |
| 2005/0172943 | A1 | 8/2005 | Cucjen et al. | |
| 2008/0020867 | A1* | 1/2008 | Manwaring | A63B 69/362 |
| | | | | 473/407 |
| 2014/0305420 | A1* | 10/2014 | Deese | A63B 69/406 |
| | | | | 124/78 |
| 2015/0352425 | A1* | 12/2015 | Lewis | A63B 71/0619 |
| | | | | 124/78 |
| 2019/0009133 | A1* | 1/2019 | Mettler May | G09B 19/0038 |
| 2020/0197782 | A1* | 6/2020 | Abdelmoneum | A63B 24/0062 |

OTHER PUBLICATIONS

The Japanese Office Action for the corresponding Japanese Application No. 2022-517441 dated Jul. 26, 2024.

* cited by examiner

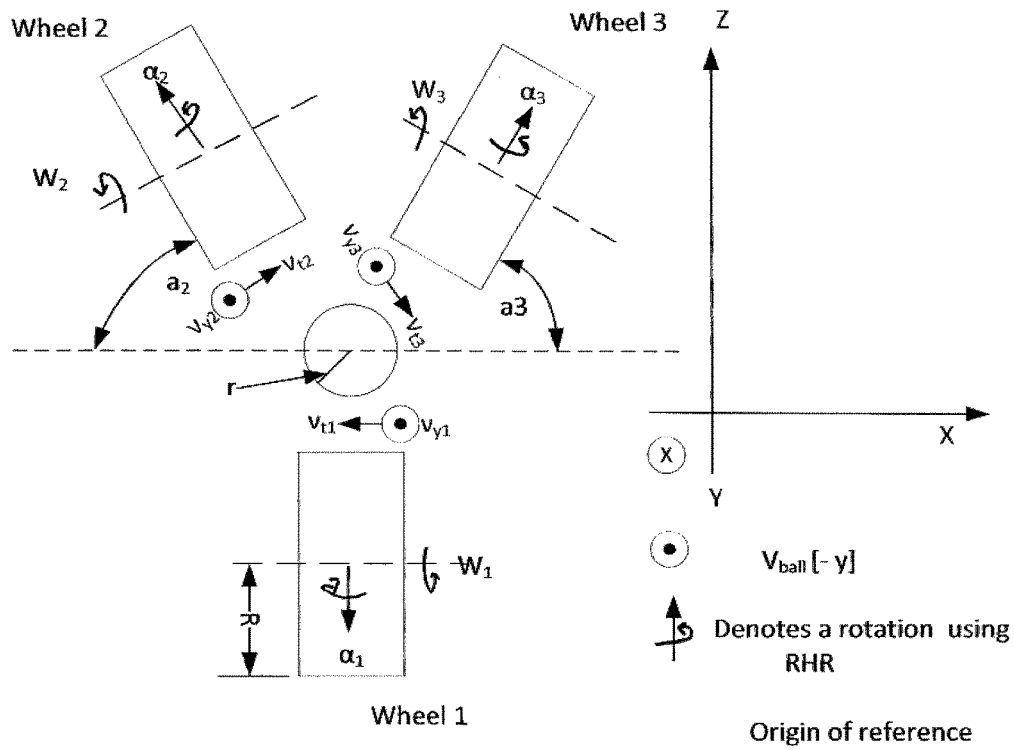

$v_{y1} = R\, W_1 \cos\alpha_1 = -v_y - r\omega_x$
$v_{t1} = R\, W_1 \sin\alpha_1 = r\omega_y$
$v_{y2} = R\, W_2 \cos\alpha_2 = -v_y + r\omega_x \sin a_2 + r\omega_z \cos a_2$
$v_{t2} = R\, W_2 \sin\alpha_2 = r\omega_y$
$v_{y3} = R\, W_2 \cos\alpha_2 = -v_y - r\omega_x \sin a_3 - r\omega_z \cos a_3$
$v_{t3} = R\, W_2 \sin\alpha_2 = r\omega_y$ Where $W_i$ represents the wheel speed of the wheel i,
R represents the wheel radius,
r represents the ball radius,
$\alpha_i$ represents the alpha rotation of the wheel i,
$a_i$ represents the angle of the wheel i with respect to the x axis,
$v_{yi}$ represents the output velocity of the point on the ball which is contacting the wheel i in the direction of the y axis,
$v_{ti}$ represents the output velocity of the point on the ball which is contacting the wheel i in the direction of the xz plane,
$v_y$ represents the output velocity of the ball as a whole, and
$\omega$ represents the output angular velocity of the ball.

Asserting that $v_{t1} = v_{t2} = v_{t3}$

Figure 21

$BS = f(MS, P)$, where
- $MS$ represents the machine state parameters
- $BS$ represents the ball state parameters
- $P$ represents the tunable parameters of the model
- $f$ represents the relationship between machine state and output ball state $E = BS_{actual} - BS_{expected}$ $P' = P - a * dE/dP$

METHOD AND SYSTEM OF REPLICATING BALL TRAJECTORIES USING AN AUTOMATED BALL THROWING MACHINE

CROSS-REFERENCE TO RELATED APPLICATIONS

This application claims priority from U.S. Provisional Application No. 62/901,879 filed on Sep. 18, 2019 which is hereby incorporated by reference.

FIELD

The present disclosure relates generally to sports machinery and, more specifically, to a method and system of replicating ball trajectories using an automated ball throwing machine.

BACKGROUND

Ball throwing machines are a common tool used for player development and are used in sports such as baseball, cricket, tennis, hockey, football and softball to help players gain experience with in-game scenarios. Interacting with balls thrown from a ball throwing machine helps players run drills, learn how to predict the path of the ball more effectively, and improve their muscle memory.

While typically used in the field of sports training, ball throwing machines are also used recreationally, in research purposes and other use cases. Common objects which are thrown from ball throwing machines include baseballs, tennis balls, cricket balls, and other sports balls.

Ball tracking systems are also often used in sports. For example, radar technology, vision systems, and other systems are often installed in proximity to or within game balls. Ball tracking technology can often be found in golf, tennis, cricket, soccer, volleyball, badminton, billiards, hurling and baseball, amongst other sports that involve ball launching. The state-of-the-art of ball tracking systems has achieved a reliable precision for tracking the ball trajectories.

Existing ball throwing machines are able to launch, or throw balls, however, the projectile path of the launched ball is hard to control and/or hard for current ball throwing machines to replicate an entire target projectile path.

Therefore, there is provided a novel method and system for automated ball throwing.

SUMMARY

The present disclosure is directed at a method and system for automated object throwing. In one embodiment, the object is a sports ball. The system includes an object launching component that launches an object based on an input from a user. The input preferably represents a trajectory that the user wishes the launched object to follow. Based on the inputted trajectory (and other criteria), the system of the disclosure may orient the object within the object throwing machine, control the machine within its environment or apply a spin or velocity to the object being launched, or a combination of these.

In one embodiment, the disclosure includes methods and systems for controlling trajectories of objects thrown from such machines. It is understood that the methods and systems described herein can apply to the launching of balls; non-spherical objects such as hockey pucks, frisbees and bullets; and any other objects whose trajectory can be controlled when launched from a machine.

It is an aspect of the present disclosure to provide a novel system, method and example embodiment of a machine capable of controlling ball launch conditions, ball trajectories or any combination thereof. The term trajectory refers to any combination of the path that the ball follows after launch and the appearance of the ball as it follows said path. The disclosure enables users to replicate tracked trajectories or select desired ball position or positions along a ball path to travel, without limitation to the beginning and end positions. In one embodiment of trajectory specification, the user may select or input beginning and end points of a trajectory. In other embodiments, the user or users may also select at least one middle point on the trajectory that they wish for the launched ball to pass on its path. Alternatively, the user may input the beginning point of the trajectory, the end point of the trajectory and multiple points on the trajectory path between the beginning and end points. The disclosure includes systems and methods for controlling some or all degrees of freedom of the trajectory or launch, and for achieving a higher degree of precision with respect to the aforementioned capabilities of launch condition control, ball path control and ball appearance control. The disclosure also includes a method for tracking human and environmental interaction with the replicated trajectory.

The present disclosure also relates to the field of data analytics in sport. Analysis of player performance is used for decision making in many areas of sport including in-game strategy, training decisions and player acquisition. These analytics may be gathered both in-game and in training. The methods described below relate to the practice of gathering data during training and providing analysis on the same, without limitation to in-game use.

In one aspect, there is provided a system for replicating ball trajectories including a ball throwing machine including a ball state sensing apparatus; a ball orientation control apparatus; a machine localization and position control apparatus; a ball speed and spin control apparatus; a controller for controlling the ball throwing machine, wherein the controller includes: a machine state to ball release state or a ball state to trajectory mapping or a combination of these; an interface associated with the controller for a user to enter ball launch inputs representing a ball release state or trajectory to be produced by the ball throwing machine; and a processing unit.

In another aspect, the system further includes a results tracking apparatus. In yet another aspect, the system further includes a closed-loop control and error correction apparatus. In a further aspect, the ball state sensing apparatus includes a set of cameras; and a set of sensors. In yet another aspect, the ball state sensing apparatus further includes a set of measuring devices.

In an aspect, the ball orientation control apparatus includes a conveyor system; and a motor control unit for controlling the conveyor system. In another aspect, the ball orientation apparatus further includes a set of tensioners. In yet another aspect, the machine localization and position control apparatus includes a set of position sensing devices; a set of actuators; and an actuation unit. In a further aspect, the machine localization and position control apparatus further includes a motion control system.

In another aspect, the system further includes an apparatus for algorithmically generating trajectories to simulate predetermined criteria for selection by a user via the interface. In yet another aspect, the system further includes an apparatus for a user to curate sets of trajectories.

In another aspect of the disclosure, there is provided a method of automated object throwing including receiving user input; processing the user input to generate object launch instructions, the object launch instructions including characteristics of a trajectory path for a launched object; and performing the object launch instructions to prepare the object for launching.

In another aspect, the method further includes launching the object. In yet another aspect, the method further includes monitoring object trajectory post launch; comparing object trajectory post launch with expected object trajectory; and performing error correction based on the comparing object trajectory post launch with expected object trajectory.

In a further aspect, performing the object launch instructions to prepare the object for launching includes re-orienting the object from an actual orientation to a desired orientation based on the object launch instructions. In yet another aspect, performing the object launch instructions to prepare the object for launching includes re-orienting an object launching machine from an actual pose to a desired pose based on the object launch instructions. In yet a further aspect, performing the object launch instructions to prepare the object for launching includes preparing the object to be launched at a required speed and spin based on the ball launch instructions.

In another aspect of the disclosure, there is provided a method of training a user including performing a method of automated object throwing; tracking user interaction with launched object; and storing result of user interaction in a database.

In a further aspect, the method further includes at least one of generating reports based on result of user interaction; generating analytics based on the result of user interaction or generating training recommendations based on the result of user interaction.

DESCRIPTION OF THE DRAWINGS

Embodiments of the present disclosure will now be described, by way of example only, with reference to the attached Figures.

FIG. 21 shows a theoretical physics model relating machine state to ball state.

DESCRIPTION

The disclosure is directed at a method and system for automated object throwing, for objects such as a ball. In one embodiment, the system receives ball launch input from a user and then launches, or throws, a ball or object based on the ball launch input. Characteristics of the ball launch, such as, but not limited to, ball trajectory, ball velocity, ball spin, orientation, release position (height and side) and release angle (horizontal and vertical) may be specified by the user in the ball launch instructions. The user may also select a previously tracked ball launch to replicate, select a ball launch from a curated or algorithmically generated list, or have individual ball launches suggested to them by the system's interface. In another embodiment, the ball launch input may include a trajectory that the user wishes the launched object to follow.

Figure 1A:
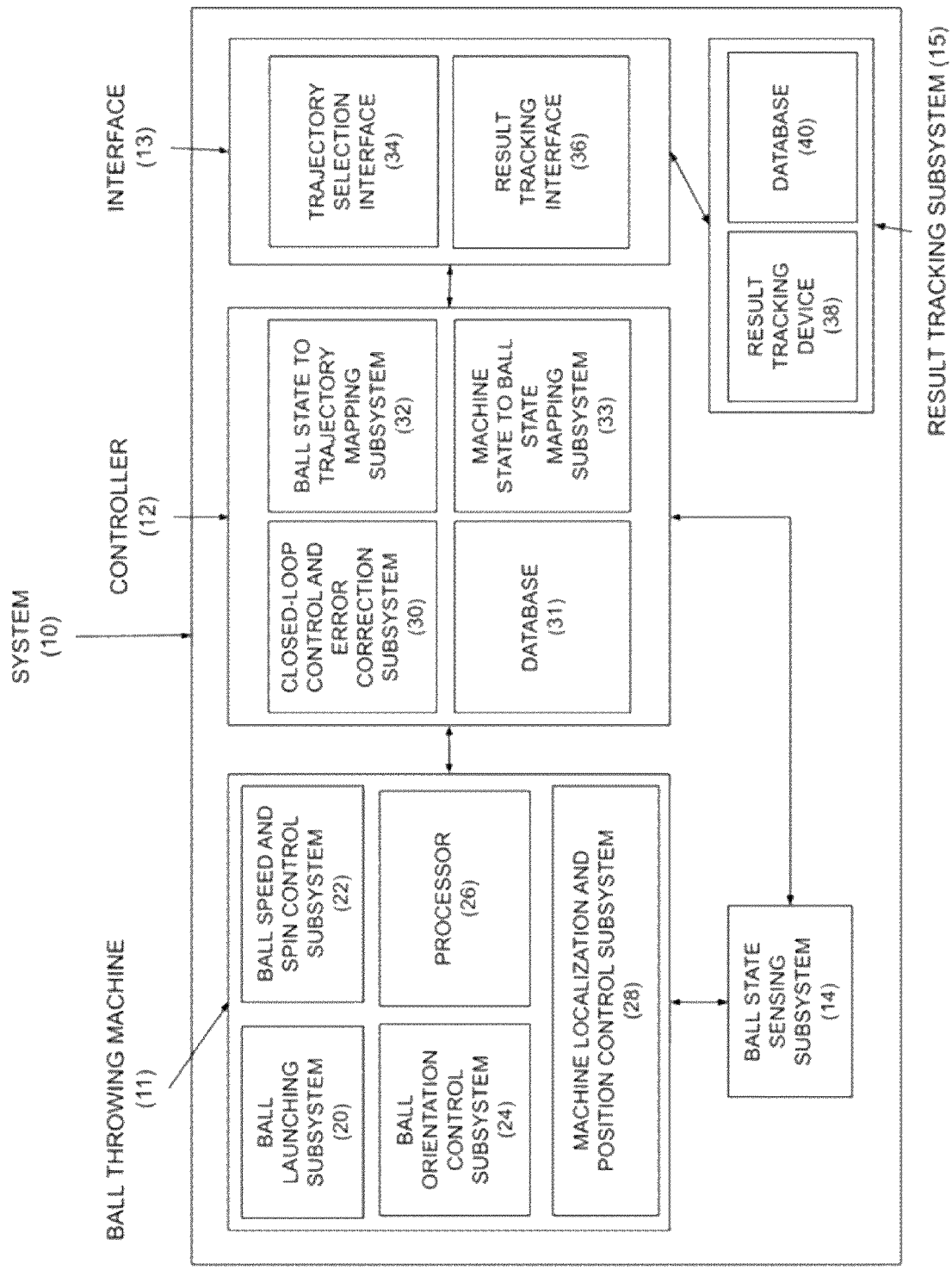
FIG. 1a is a schematic diagram of a system for automated ball throwing.

Turning to FIG. 1a, a schematic diagram of a system for automated ball throwing is shown. It will be understood that the machine may also launch other objects such as Frisbees or hockey pucks or any object that can be launched having a trajectory. In the current embodiment, the system 10 includes a ball throwing machine 11 that is connected to a controller 12. The controller 12 receives ball launch input from a user via an interface 13 and then translates this input into ball launch state specifications which are then transmitted as ball launch instructions to the ball throwing machine 11. The instructions enable desired characteristics of the ball to be thrown, launched or pitched as selected, or inputted, by the user. The ball throwing machine 11 then pitches or throws a ball based on the instructions.

In one embodiment, the ball throwing machine 11 includes a ball launching subsystem 20; a ball orientation control subsystem 24; a machine localization and position control subsystem 28; a ball speed and spin control subsystem 22; and a processor 26. In the current embodiment, the controller 12 includes a closed-loop control and error correction subsystem 30, a machine state to ball state mapping subsystem 33, a ball state to trajectory mapping subsystem 32, and a database 31. The system 10 may further include a result-tracking subsystem 15 that includes a result tracking device 38 and a database 40. Instead of its own database, the result-tracking subsystem may use the database 31. A ball state sensing subsystem 14 may also be used by the system 10. An interface 13 of the system can include a trajectory selection interface 34 which enables the user to select specific trajectories to launch. The interface 13 can also include a result tracking interface 36 which combines data from the ball throwing machine 11 and the result tracking subsystem 15 to provide the user with data of the results of their interaction with the machine.

As discussed above, the ball throwing machine 11 includes processor 26. The controller 12 may also include its own processor (not shown) or may utilize the processor 26 within the ball throwing machine 11. The controller 12 may also include its own database 31 of data from previous launches of the ball throwing machine.

Figure 19:
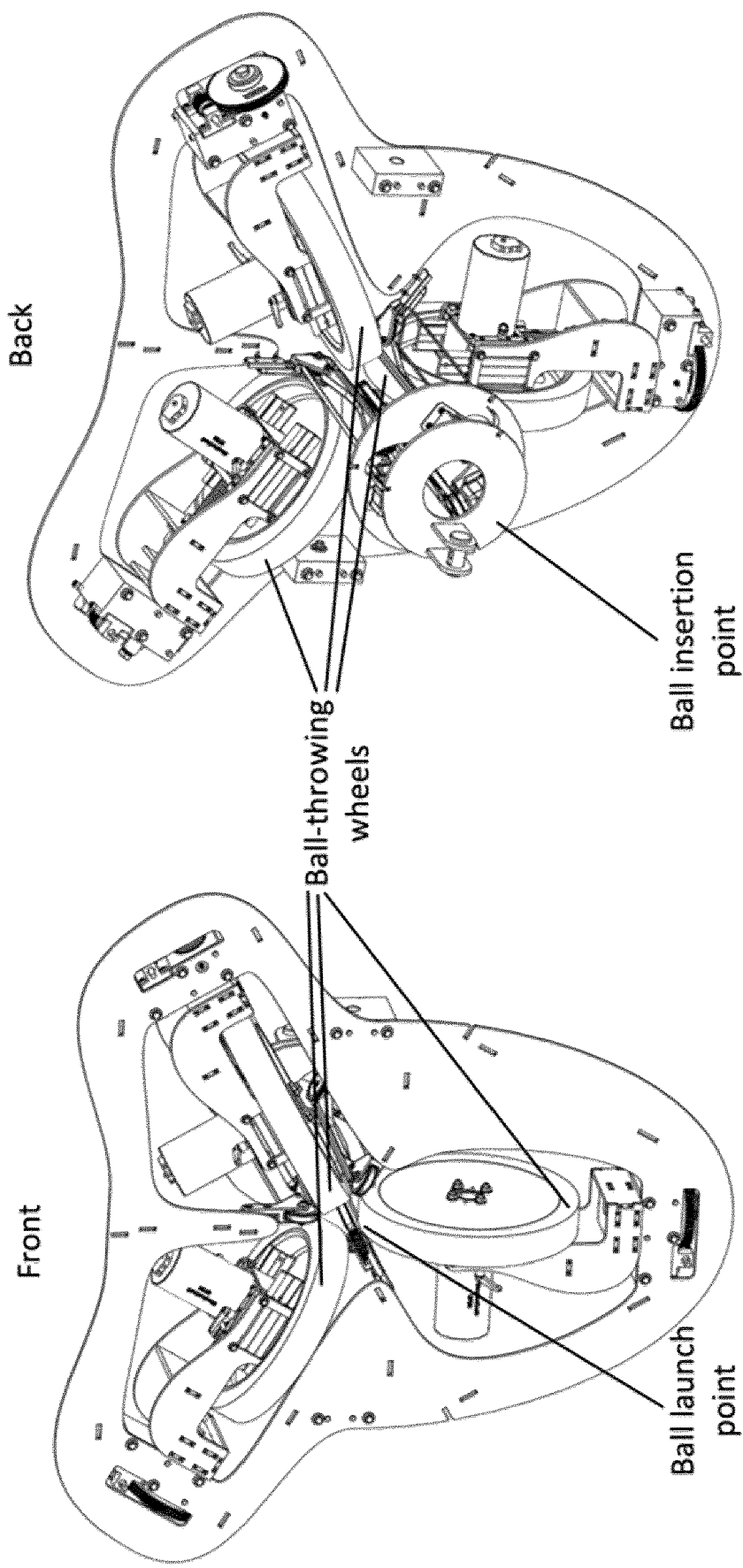
FIG. 19 illustrates an embodied system capable of imparting 3D spin and arbitrary output velocity to a ball.

The ball launching subsystem 20 may be seen as the components that enable the ball throwing machine 11 to launch the ball. One embodiment of a ball launching subsystem 20 is schematically shown in FIG. 19 which presents an embodiment where flywheels and motors are used for ball launch. In other embodiments, the ball launching subsystem 20 may include a mechanical launch apparatus, variant configurations of flywheels and motors or a pneumatic canon system.

The ball state sensing subsystem 14 assists in monitoring the different states and/or positions of the ball prior to, during and/or after the ball is launched. An advantage of this subsystem is that trajectory control of the ball being launched may be improved. In one embodiment, the ball state sensing subsystem 14 may assist in error correction by communicating with the closed-loop control and error correction subsystem 30. Another advantage of the ball state sensing subsystem 14 includes the ability to display detected launch conditions of the ball or object to the user. Further, the ball state sensing system 14 assists in automating ball orientation control by providing feedback that may be used by the ball orientation control subsystem 24, which enables control of the state of the ball before it is inputted into the launching mechanism of the machine, as will be discussed below. The integration of such a subsystem 14 into ball throwing machines 11 for the above purposes or to facilitate the addition of these and other features provides at least one advantage for the system and method of the disclosure over current ball throwing machines.

The ball's state may be seen as including at least one of the following parameters of a ball: its position, orientation, velocity, and/or angular velocity. Alternatively, the ball's state could be determined or extracted by directly measuring other features or characteristics of the ball, such as, but not limited to, its trajectory, acceleration, spin magnitude and inferring its state from those features.

Figure 1B:
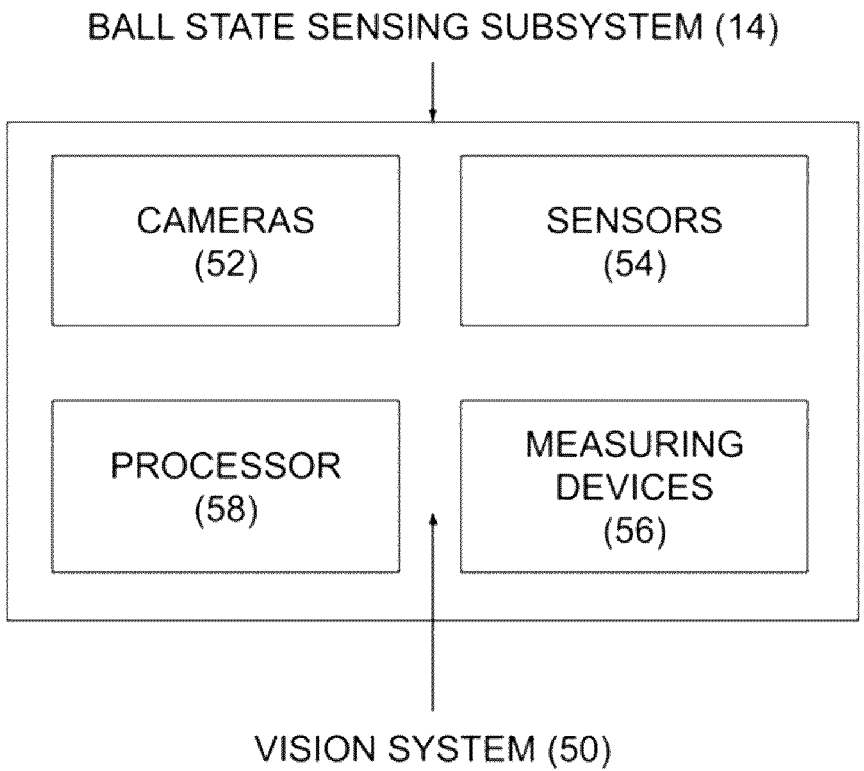
FIG. 1b is a schematic diagram of a ball state sensing subsystem.

Turning to FIG. 1b, a schematic diagram of one embodiment of the ball state sensing subsystem 14 is shown. In this embodiment, the ball state sensing subsystem 14 includes a vision system 50 having a set of at least one camera 52 that is calibrated to observe a known region of interest or feature of the object being thrown or launched. This is shown in more detail in FIG. 6. The vision system 50 in FIG. 1b may also include a set of sensors 54 and/or measuring devices 56. The ball state sensing subsystem 14 may further include a processor 58 which may be the same as processor 26. In the current embodiment, the ball state sensing subsystem 14 is integrated within the ball throwing machine 11, however, it may also be an independent component that interacts with the ball throwing machine 11.

During the calibration process, measuring devices 56 such as rulers and other objects of known dimensions are placed in the fields of view of each of the cameras 52 and images taken. These images are used by the vision system 50 to determine how the position of the different objects in the images taken correlate to the position of objects in the machine's local reference frame or a local or global reference frame that the machine exists within. The cameras 52 can capture images of the ball to determine the ball's position and orientation. Multiple images of the ball that is to be launched or after the ball is launched are taken at known time intervals, and the position of the ball at each time interval provides the ball's position, while the change in position per unit time may be used to determine the ball's velocity. Similarly, the orientation of the ball can be determined from the ball's detected orientation within images from the cameras 52, and the ball's change in orientation per unit time can be used to determine the ball's angular velocity. Since each camera can preferably extract precise information about the dimensions of state which are perpendicular to its visual axis, multiple cameras positioned at different angles can provide an accurate extraction of all three dimensions of position and velocity.

In a preferred embodiment, the ball state sensing system 14 extracts the ball's position, orientation, velocity, and angular velocity after the ball has been launched. Each of these characteristics have three-dimensional (3D) components in their full form. The system may extract these characteristics from video data, either with a single camera or multiple cameras that are integrated within the pitching machine or placed in areas adjacent the machine.

Figure 6:
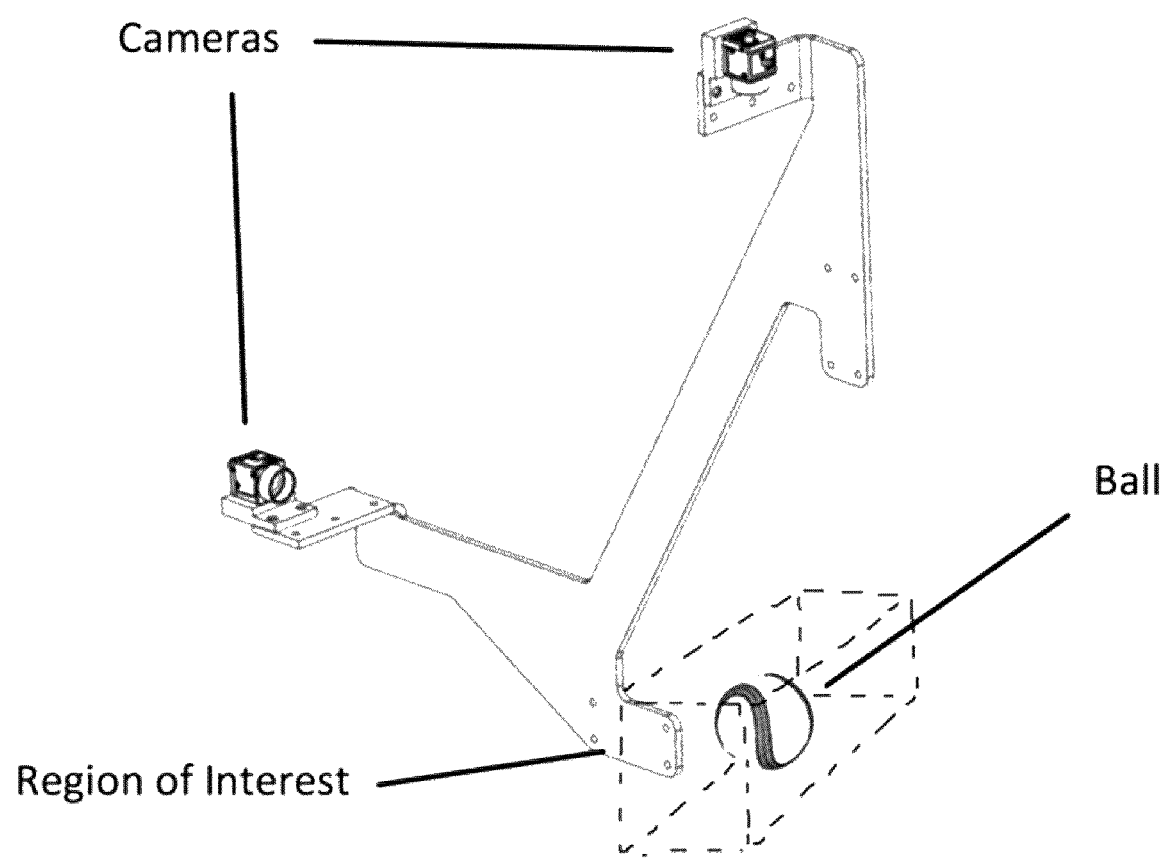
FIG. 6 illustrates a potential arrangement of cameras capable of extracting ball state information.
Figure 7:
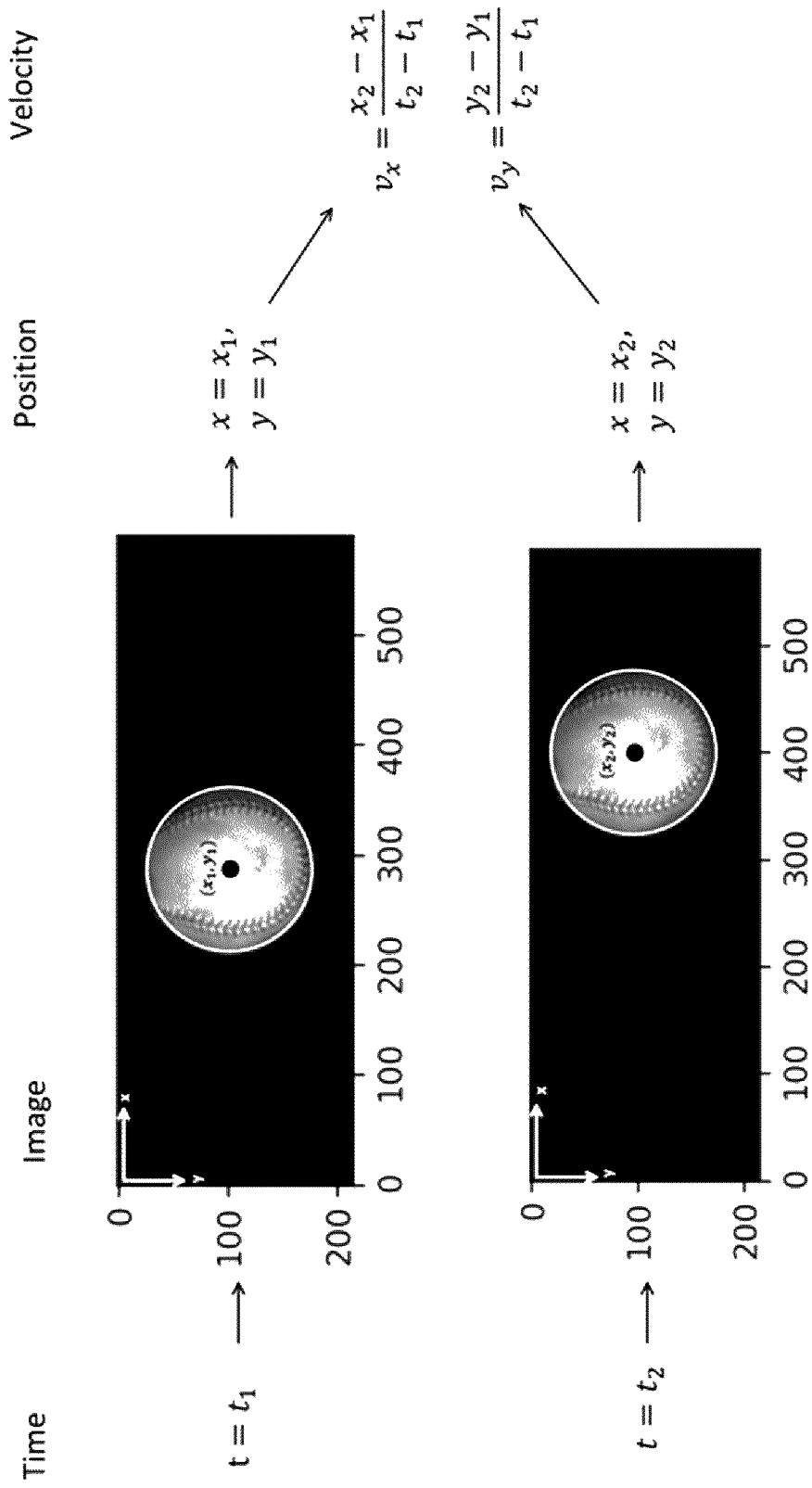
FIG. 7 illustrates an implementation of the ball position and velocity extraction using a baseball.

FIG. 6 illustrates one arrangement of cameras capable of extracting this information. FIG. 7 illustrates an implementation of the extraction using a baseball from the perspective of one camera, wherein the single camera takes multiple photos at known times, extracts the ball's position, and uses the change in position to determine velocity. In another embodiment, multiple cameras can be used to inform more dimensions and provide increased robustness.

To extract the orientation of the ball, a 3D model of the ball being thrown is retrieved from the database 31. The 3D model includes known features of the ball such as, but not limited to, visually distinct features of the ball's texture and/or features of the ball's shape. These features may be unique, such as a single unique marking on the ball, or they may be generic, such as a feature which occurs many times on the ball. An example of a feature used in the one implementation are the stitches of a baseball.

Figure 8:
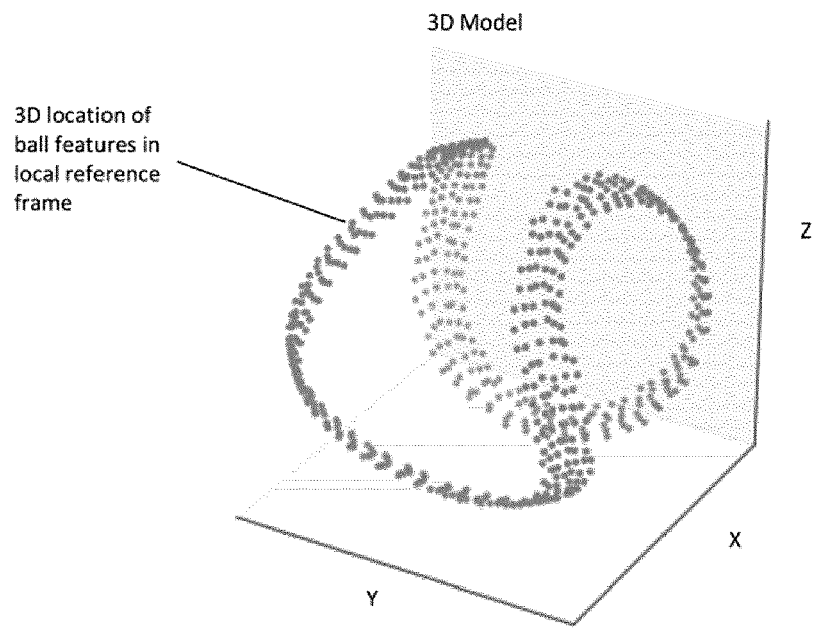
FIG. 8 illustrates a virtual 3D model of a baseball which includes the stitches as features.
Figure 9:
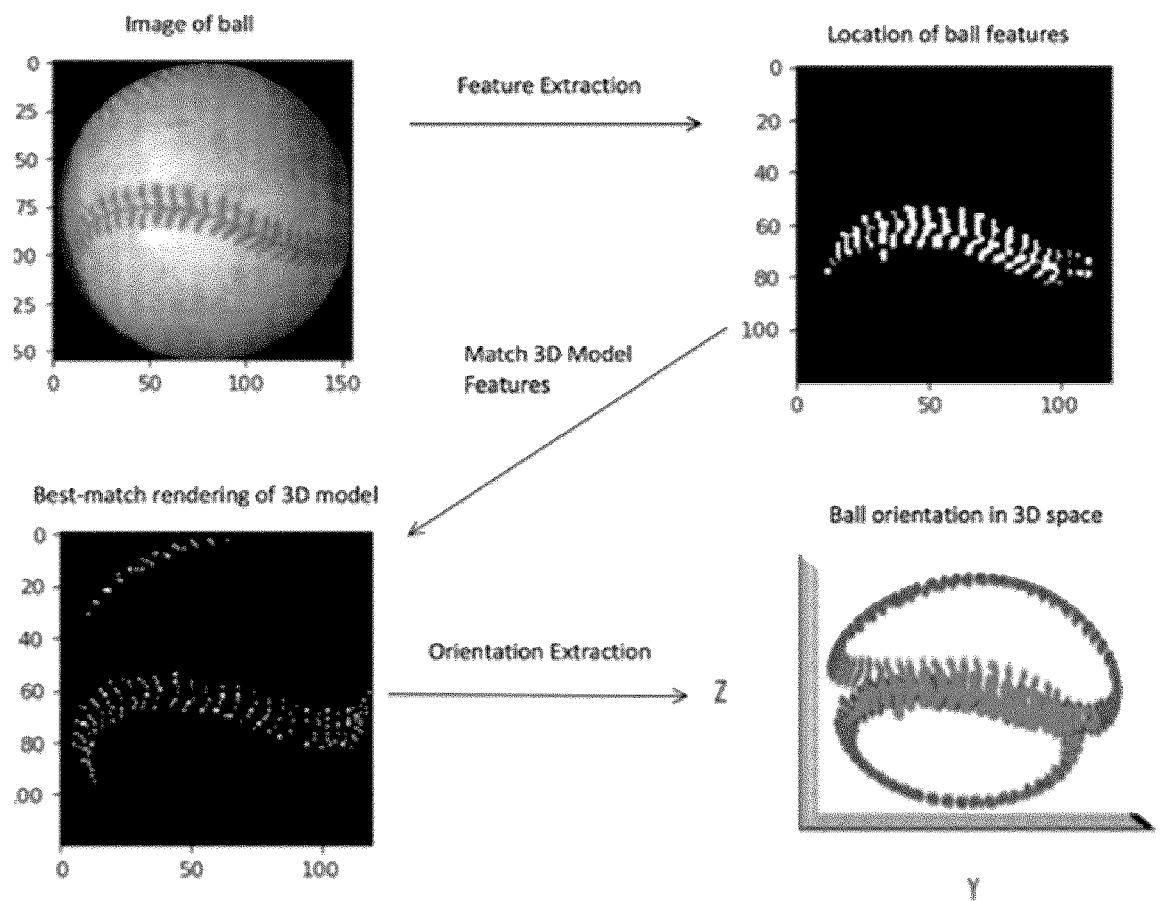
FIG. 9 illustrates the process of extracting the ball's orientation by matching observed points with a 3D model.

FIG. 8 illustrates a virtual 3D model of a baseball which includes the stitches as features. In this implementation of the ball state sensing subsystem 14, analytical based (Harris Feature Detection) or example based (Machine Learning) feature extraction algorithms extract features from images of the ball that have been captured by the set of cameras 52 and determines the orientation of the ball by aligning the features in the virtual 3D model with the extracted features in the images. The alignment may be performed both prior to launch and when the ball is being launched. A feature matching algorithm, for example such as a Brute Force Matcher or FLANN Matcher, then determines what orientation the 3D model should have to cause the set of cameras to observe the features as seen in the launch ball image or images. In one embodiment, the algorithm takes or algorithms take renderings of the features of the 3D model in many orientations, and then matches the renderings with the image to determine what orientation the ball is in the image. FIG. 9 illustrates one process of extracting the ball's (baseball) orientation, using a single camera, by extracting known features (baseball stitches), comparing the image with extracted features with renderings of those features at different angles, and then extracting the 3D orientation of the rendering with the best match. In this example, a best match is defined as the rendering of the 3D model whereby the features in the rendered image have the highest degree of pixel-wise overlap with the features in the extracted image. While FIG. 9 shows the orientation extraction using one camera, the system may include multiple cameras. If the system includes multiple cameras independently extracting orientation information, the ball state sensing subsystem 14 may provide a more robust knowledge or understanding of the ball's orientation. Extraction of angular velocity simply involves extracting the ball's orientation at several instances of time and determining the change in orientation per unit time, with equations found in FIG. 7.

In an alternative embodiment, the surface of the ball may be extracted from an image of the ball, using the known shape of the ball or ball type. The features on the image may then be projected onto the surface of the ball as 3D features. These 3D features are then matched to the features in the virtual 3D model of the ball. The change in orientation between the features in the image and the features of the virtual 3D model assist to determine the ball's orientation in the image, seen in FIG. 9.

In another embodiment of the system of the disclosure, the system 10 may include two ball state sensing subsystems 14. One to determine the orientation of the ball being inserted into the throwing machine 11 and another to determine the state of the ball as it is launched from the machine 11. In some embodiments, only one ball state sensing system 14 may be used for either or both functionalities.

It is understood that the ball state sensing system or subsystem 14 may also be implemented using at least one vision system that is separate from the machine rather than being integrated within the ball throwing machine 11. Other systems, such as radar systems, motion sensors, or any sensor system that is equipped with the ability to extract the ball's state at some point on the trajectory may be used instead of a vision system.

Figure 1C:
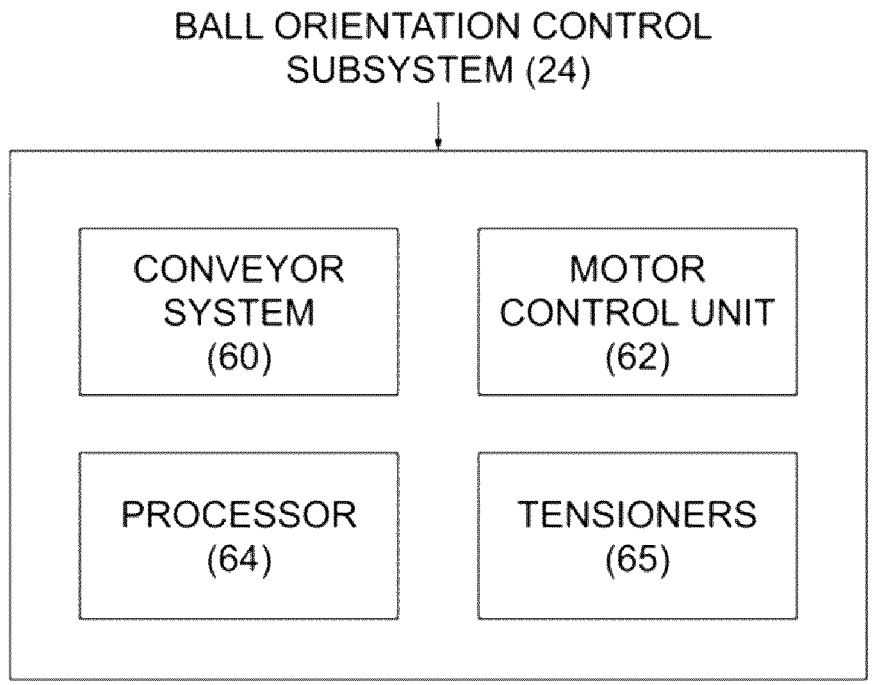
FIG. 1c is a schematic diagram of a ball orientation control subsystem.

With respect to the ball orientation control subsystem 24, as schematically shown in FIG. 1c, the subsystem 24 may assist in controlling the ball's orientation as it enters and exits the ball throwing machine 11. An advantage of the ball orientation control subsystem 24 is that control of the ball's orientation can be automated rather than requiring a user to place a ball in an expected orientation each time a ball is to be launched as it can be quite time consuming. By controlling ball orientation, ball throwing machines may be more precise and ball trajectory can be controlled in an improved manner.

Turning to FIG. 1c, a schematic diagram of one embodiment of the ball orientation control subsystem 24 is shown. In the current embodiment, the subsystem 24 includes a conveyor belt unit 60 including at least two conveyor belts, a motor control unit 62; and processor 64 which may be the processor 26 of the ball throwing machine 11. In an alternative embodiment, the ball state sensing system 14 may also be part of, or integrated with, the ball orientation control subsystem 24. In one embodiment, the ball orientation control subsystem 24 provides the functionality to programmatically control ball orientation, and programmatically control ball delivery speed to the ball launching subsystem 20.

Controlling these parameters of the system 10 are beneficial to trajectory replication because the specific orientation of the ball affects its aerodynamic properties, and the input orientation and speed of the ball as it enters the ball launching subsystem 20, which affects how the ball throwing machine 11 interacts with the ball. Failure to control these aspects of the ball throwing machine 11 may cause random error, yielding unpredictability, and ultimately limiting controllability of trajectory. The appearance of balls throughout their trajectory is also highly impacted by their input orientation, as illustrated in FIG. 11, which shows the appearance of baseballs due to motion blur at varying orientations and spin axes.

With the ball orientation control subsystem 24, the system of the disclosure can orient the ball into a desired orientation independent of its initial orientation, enabling precise orientation and positioning. The importance of automated orientation relates to the desired repeatability of the ball throwing machine, both in controllable interaction between the machine and the ball and the controllable ball trajectory once it leaves the machine. Further importance of automation regards the ease with which and the rate at which balls can be delivered repeatedly to the ball throwing machine 11.

Figure 10A:
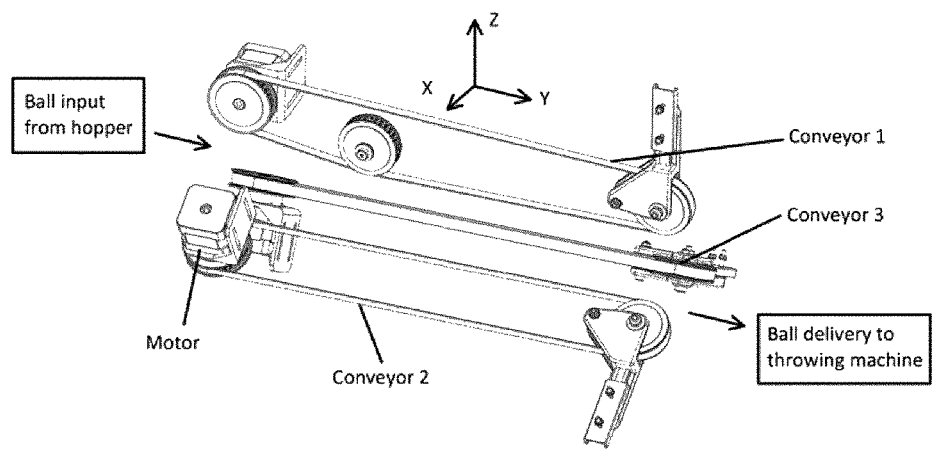
FIGS. 10a and 10b display a conveyor belt unit with three (3) belts.
Figure 10B:
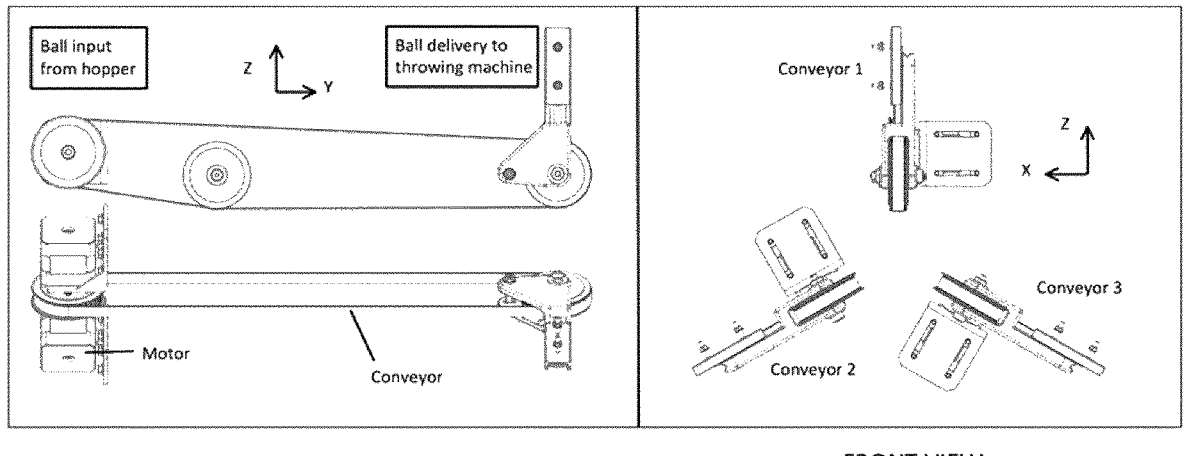

Another schematic embodiment of the ball control orientation subsystem 24 is shown in FIGS. 10a and 10b. As shown, the system 24 includes the multi-conveyor system 60, which in the present embodiment includes three conveyor belts and associated mounts (not shown). It will be understood that any number of belts and corresponding motor or motor control units are contemplated. Fewer than three (3) belt-motor systems may be used in conjunction with a pivoting mechanism to enable arbitrary three-dimensional orientation of balls. It is understood that additional belt-motor systems could also be used to achieve arbitrary three-dimensional orientation of balls.

Figure 12:
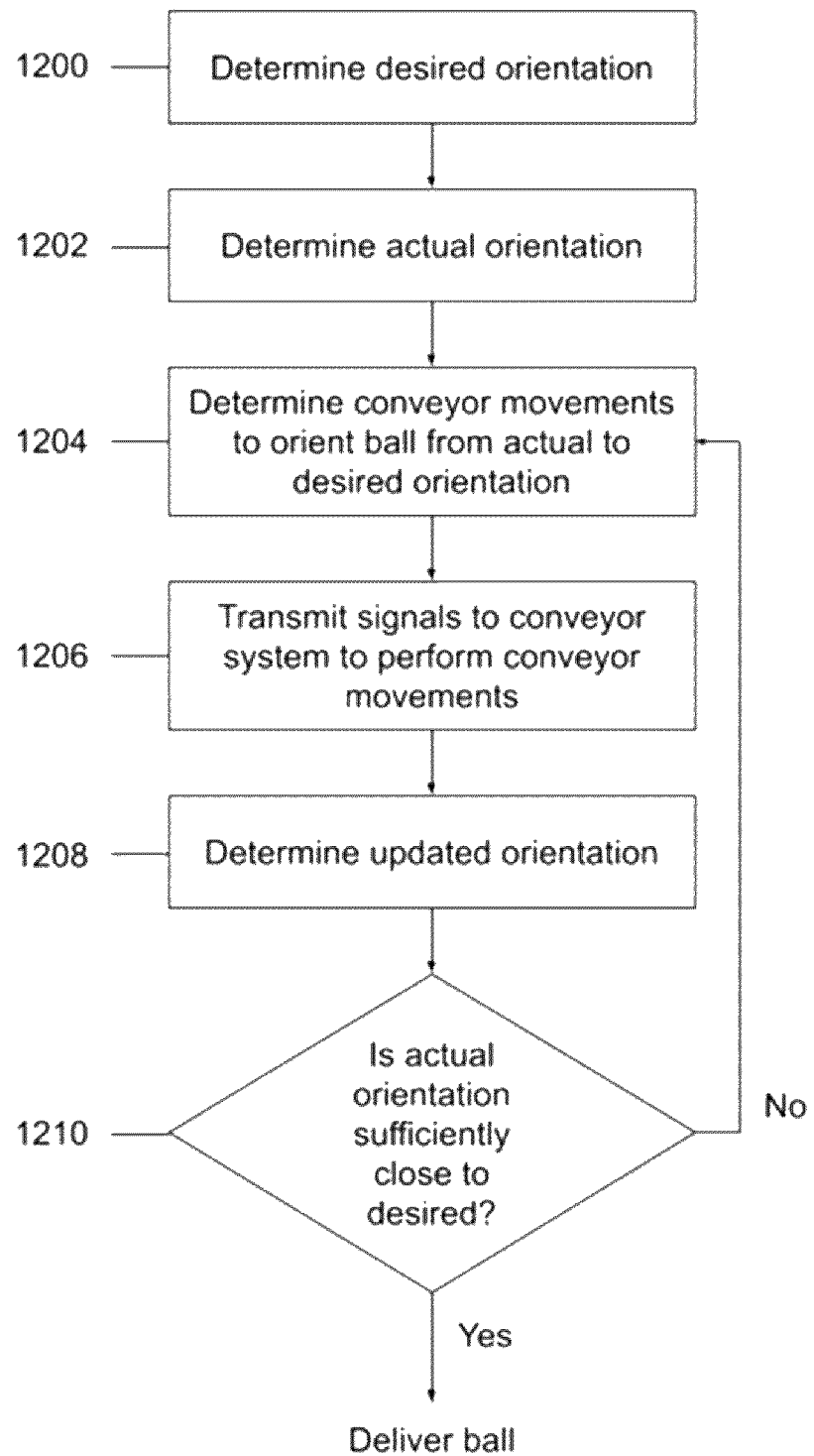
FIG. 12 shows the process which is used to generally reorient the ball.

In operation, the system, or ball throwing machine 11 accepts, or receives, one or more balls in unspecified orientations from a source, such as a hopper, basket, or some other container. The source may actively pass in one ball at a time or passively allow balls to pass in in an uncontrolled manner. To move the ball forward in the orientation control subsystem 24, all or some conveyor belts 60 move forward to pull the ball in by friction. Once the ball is within the multi-conveyor belt unit 60, the ball state sensing system 14 extracts the ball's orientation. Then, by moving the conveyor belts 60 with respect to one another, the ball's orientation can be changed or manipulated based on a determination by the processor 64. The subsystem 24 generally reorients a ball by detecting the ball's orientation, accepting or receiving a target, or desired, orientation, and determining the needed change in orientation between the current orientation and the desired orientation. The processor, or processing unit, 64 then determines a combination of conveyor movements which can impart this needed change in orientation and sends instructions to the motor control unit 62 to impart the conveyor movements. The system may, if desired, use the ball state sensing system 14 to check if the ball was correctly oriented. FIG. 12 shows one process which is used to generally reorient the ball. FIG. 10*b* shows an example coordinate system for the orientation control system.

As shown in FIG. 12, a desired orientation is received or determined by the processor 64 (1200). This desired orientation may be based on the ball launch state specifications. The system then determines the current orientation of the ball as received from the source (1202). The system then determines the conveyor movements required to orient the ball from the current orientation to the desired orientation (1204). In a specific example, the target, or desired, orientation is inputted by a user as a quaternion, a set of Euler angles, or another method of describing orientation. The target, or desired, orientation can also be inputted by replicating the orientation of a ball whose trajectory was previously tracked via the trajectory selection interface 34.

The conveyor movements are then transmitted as signals to the ball orientation subsystem 24 (1206) in order to move or orient the ball from the current orientation to the desired orientation so that the ball is in the desired orientation prior to being launched.

After the conveyor movements have been conveyed on the ball, the system may check the updated orientation of the ball (1208) to see if the orientation of the ball is sufficiently close to the desired orientation (1210). If not, further conveyor movements may be determined by the processor such that the ball can be moved again to get the ball closer to the desired orientation (1204). If the ball is sufficiently close to the desired orientation, the ball can be delivered, or launched by the ball launching subsystem 20.

Figure 11A:
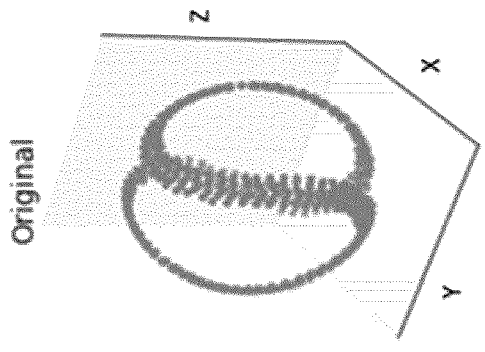
FIG. 11a to 11d shows an example of an arbitrary reorientation of a baseball.
Figure 11B:
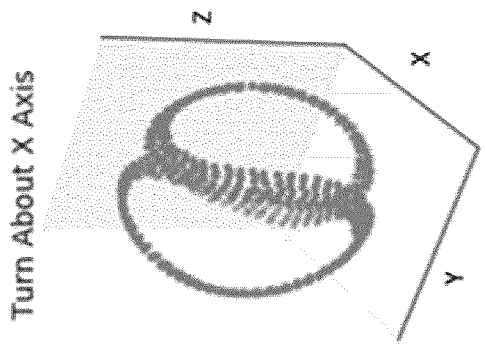
Figure 11C:
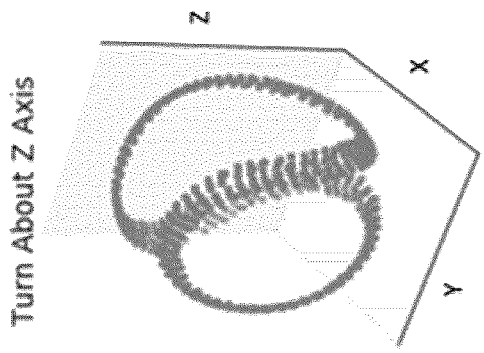
Figure 11D:
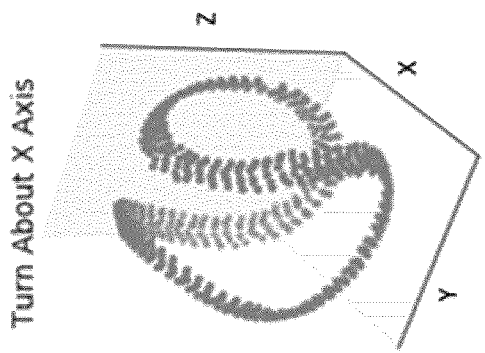

An example is shown in FIGS. 11*a*-11*d*, it is assumed that the desired orientation of the baseball is shown in FIG. 11*d*. If the input, or current, orientation is shown in FIG. 11*a*, the processor 64 determines the conveyor movements needed to re-orient the baseball from the current orientation to the desired orientation. For example, the processor 64 may determine that the conveyor system 64 needs to turn the baseball about the X-axis (FIG. 11*b*) and then turn the baseball about the Z-axis (FIG. 11*c*) before turning it again about the X-axis (FIG. 11*d*) so that the baseball is oriented to the desired orientation prior to launch.

For the system of FIGS. 11*a* to 11*d*, in one example, a turn about the Z-axis may be executed by keeping conveyor 1 (*one*) still and moving conveyors 2 (*two*) and 3 (three) in opposing directions. A turn about the X-axis may be executed by moving conveyor 1 (*one*) in one direction and moving conveyors 2 (*two*) and 3 (three) together in the opposing direction. This example of X-Z-X conveyor movements is merely an example and is not the only method by which the ball orientation subsystem 24 can re-orient a ball. Further, a baseball is merely used as an example of an object which can be re-oriented using this system.

In another embodiment, the ball orientation system may include a set of suction cups rather than conveyor belts. To impart the same conveyor movements as discussed above, one suction cup on the X-axis (beside the ball) can grab and rotate it in the X direction, another suction cup on the Z-axis (below the ball) can grab it and rotate it in the Z direction. The ball state sensing subsystem 14 and the processor 64 could then, using the same method as described above, determine the required combinations X and Z rotations to move the ball from its initial arbitrary orientation to any desired orientation. This could include an X-Z-X combination of rotations or a Z-X-Z combination of rotations. Finally, a third (pneumatic or electrical) linear actuator could grab the ball (from behind the ball) and push it forward into the ball launching subsystem 20 with controlled velocity.

Precise positioning control of the conveyors results in the precise re-orientation of the ball. In this embodiment, this can be accomplished with standard motor control units 62. More specifically, stepper motors with stepper motor drivers can be used to control conveyor position with high accuracy.

In accordance with controlling ball delivery speed, control of the speed at which the ball is delivered to the ball launching machine may be implemented as described below. By moving all conveyors simultaneously, the ball can be moved translationally forward and back through the machine with known velocity. In the embodiment illustrated in FIG. 10*a*, if all conveyors are moved with equal speed, then the ball will move forward with a speed equal to that of the conveyors. Through this method, the speed of insertion of the ball into the machine can be controlled. The precise velocity control of the conveyors can be accomplished using the motor control unit 62 as discussed above.

Figure 13:
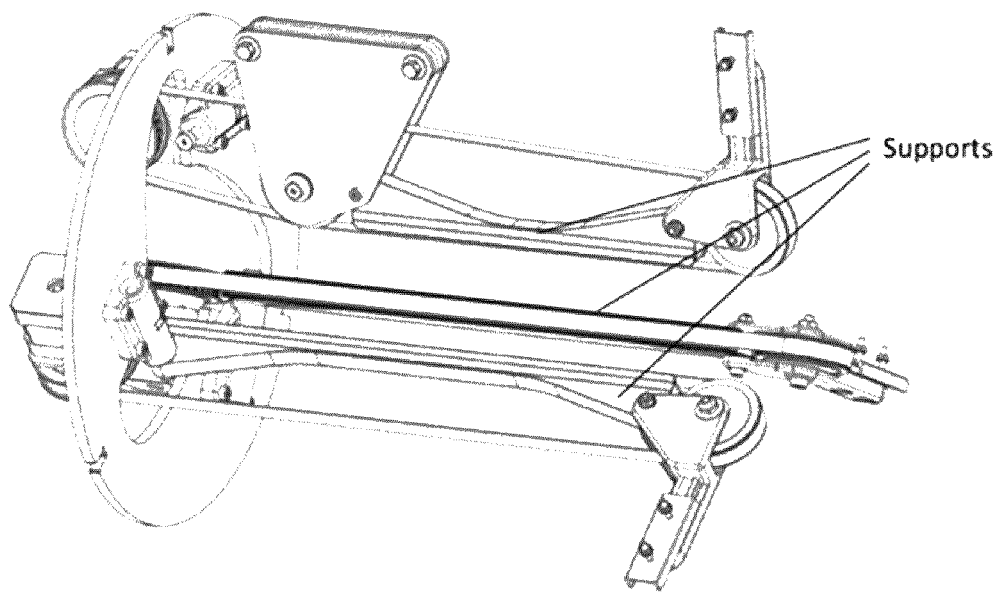
FIG. 13 illustrates the elements which control the force between the ball and the conveyors.
Figure 14:
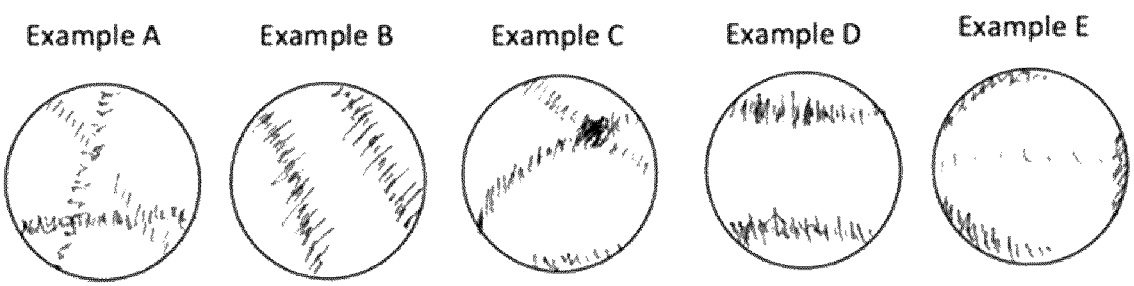
FIG. 14 shows the changing appearance of baseballs due to motion blur for varying orientations and spins.

Furthermore, the connection between the ball and the conveyors improves the system's precision as a whole. The ball orientation control subsystem 24 may further include tensioners 65 and supports to control the contact force between the conveyors 60 and the ball to prevent or reduce slip between the conveyors and the ball, which impacts precision. As is understood, the force between the ball and the conveyors impacts the delivery of the ball to the throwing machine. The elements which control the force between the ball and the conveyors are illustrated in FIG. 13. The relative positions of the wheels shown in FIGS. 10*a* and 10*b* determine both the force of the conveyors onto the ball as well as the tension in the conveyors themselves. Additional tensioners can be added to the conveyor system 60 for additional tension. The position of the supports shown also impact the forces between the conveyor system and the ball.

The ball orientation control subsystem 24 could be implemented by the belt feed system, as discussed above, or by a robotic arm, human insertion, mechanical tool or by another apparatus. The present embodiment is not intended to limit the disclosure or its application or uses in any way. The method described is also not intended to limit the potential applications or uses.

Figure 1D:
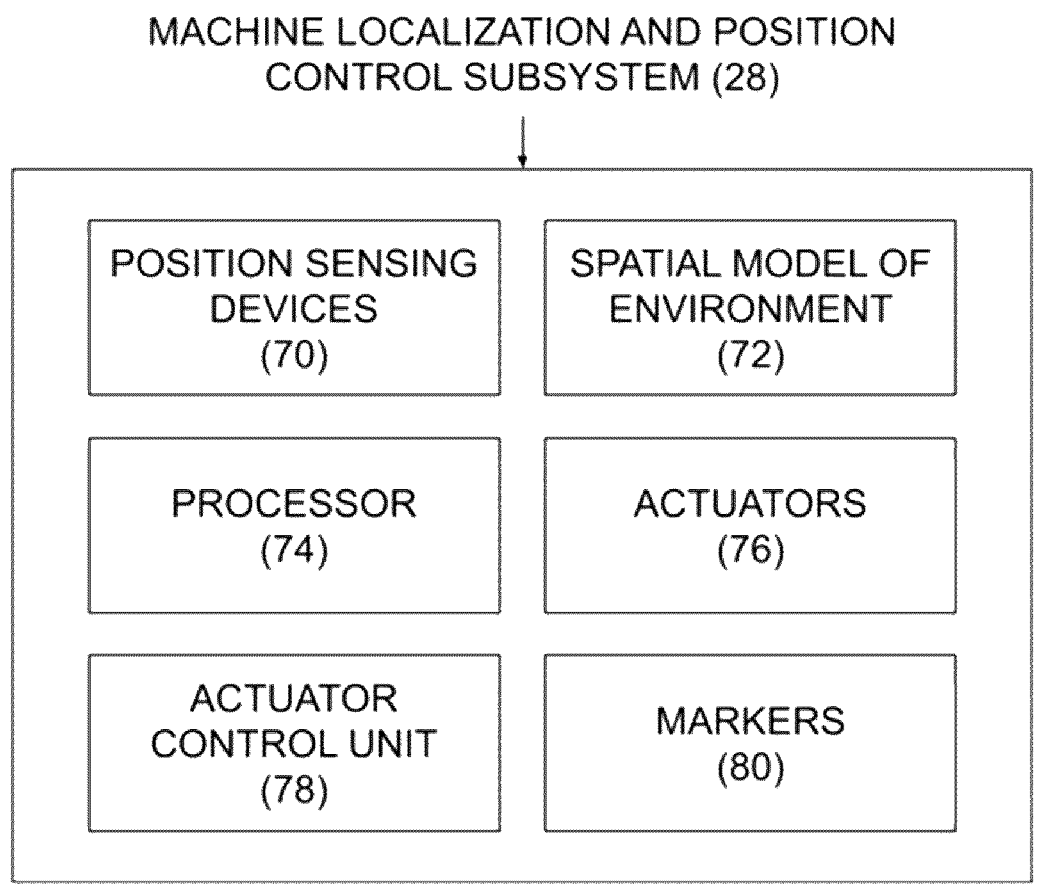
FIG. 1d is a schematic diagram of a machine localization and position control subsystem.

With respect to the machine localization and position control subsystem 28, as schematically shown in FIG. 1*d*, while the ball orientation control system 24 provides an apparatus to control the ball's initial orientation, the ball's total state at launch includes the combination of its position, orientation, velocity, and angular velocity. Since the ball's local position within the ball throwing machine 11 at launch is controlled mechanically (as described above with respect to ball orientation control subsystem 24), the machine's position in its environment determines the ball's launch position within that environment. Further, since the ball's local orientation with respect to the machine 11 is controlled by the ball orientation control system 24, the ball's orientation with respect to the environment depends on the machine's orientation.

The method of controlling the ball's launch pose with respect to the environment by controlling the ball's pose with respect to the machine and controlling the machine's pose with respect to the environment is hereby described. The term pose hereby refers to the combination of both position and orientation of an object.

In one embodiment, the machine localization and positioning control subsystem 28 includes position sensing devices 70, a spatial model of the environment 72, a processor 74, or processor 30, actuators 76, and an actuator control unit 78. The system 28 may also include markers 80 to denote features. The machine localization and positioning control subsystem 28 may perform the functionality of controlling ball locations within the environment by controlling the position of the ball throwing machine 11.

Firstly, the position sensing devices 70, or sensors, can be placed on the ball throwing machine 11 to detect the relative position of the pitching machine (or the sensor itself) with respect to the environment, or environmental features. These sensors can include, but are not limited to, ranging devices which read the distance to a feature or structure (such as a post or tree) proximate the pitching machine and/or image sensors which detect the position of a feature with respect to the image sensor's field of view. Markers 80 can be placed within the environment to denote, or act as, features, or natural environmental features can be used. The processor 74 can then leverage the spatial model of the environment 72 to compare the spatial model with the position sensor data to determine the ball throwing machine's position within the environment.

In an alternative method of localization, the position sensors 70 can be placed in a position of known environmental features and can detect features on the ball throwing machine 11. The processor 74 can then compare these position readings with the spatial model of the environment 72 to determine the machine's pose. In another alternative method, global position sensing (GPS) data and other sensor data on the machine such as GPS, compass, and accelerometer data can be combined with the spatial model of the environment 72 by the processor 74 to determine the machine's pose with respect to its environment.

Figure 15:
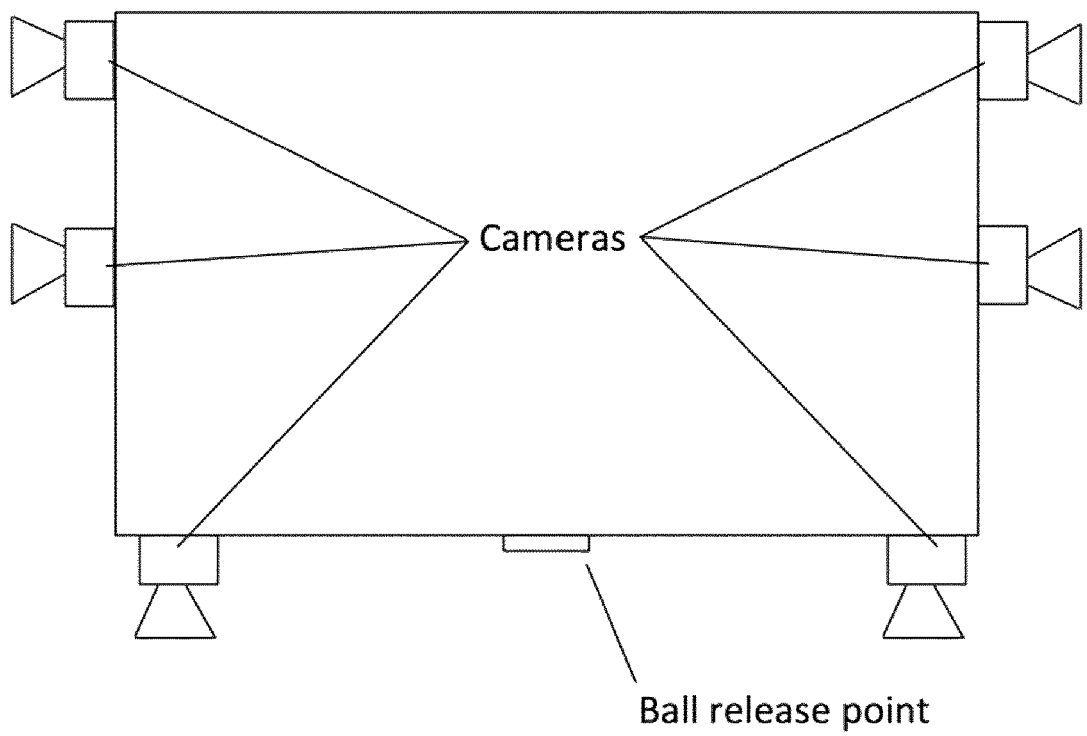
FIG. 15 presents a configuration of cameras on a ball throwing machine.
Figure 16A:
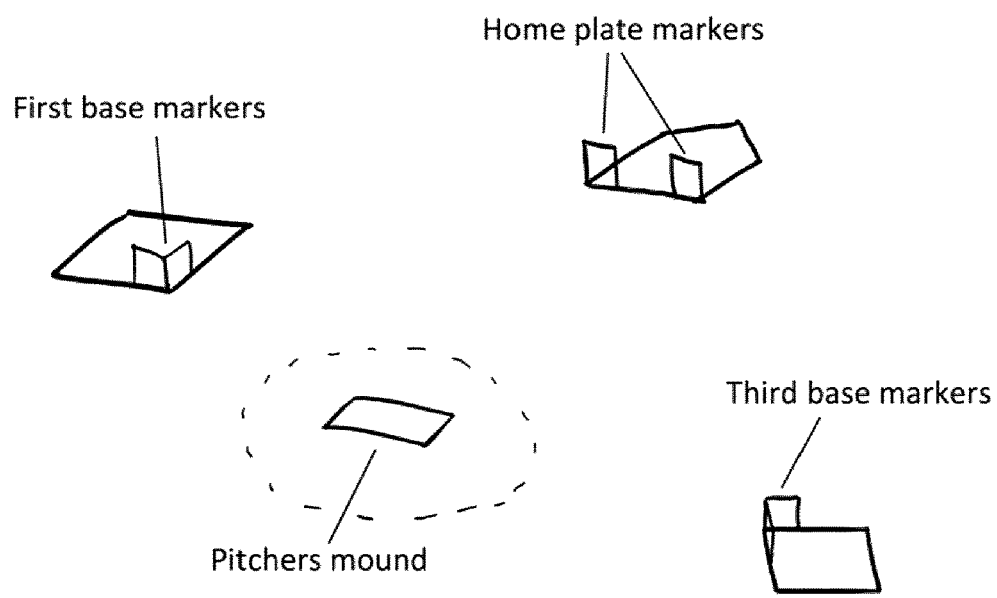
FIGS. 16a and 16b illustrate the positioning of the markers.
Figure 16B:
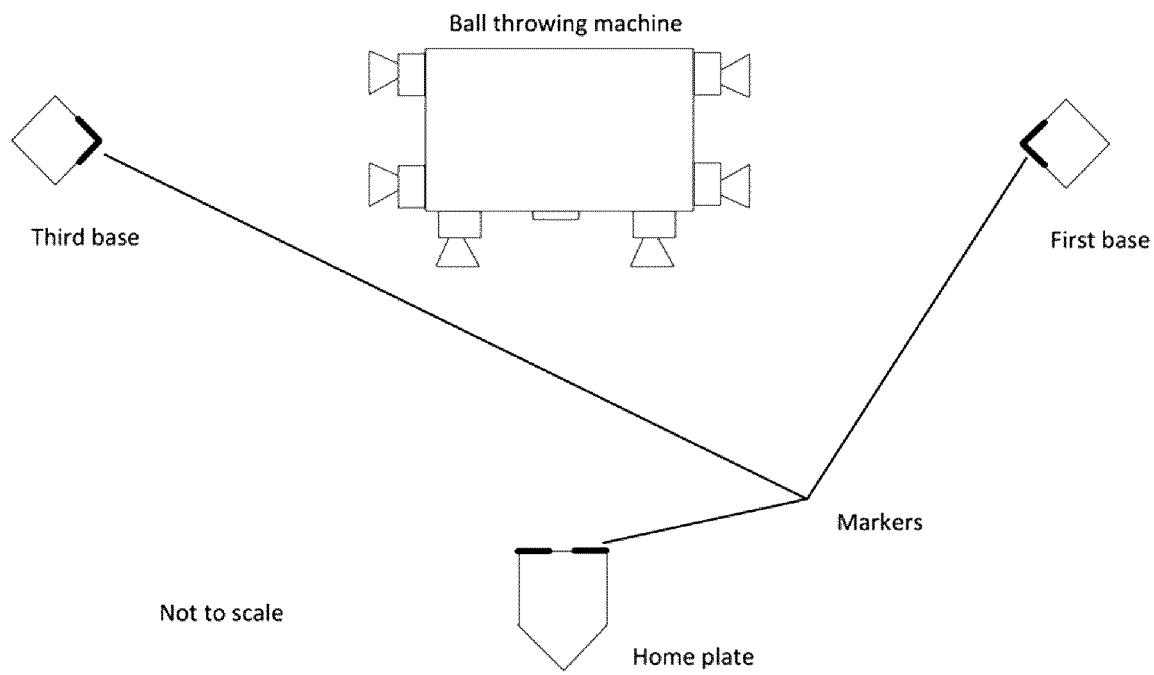
Figure 17A:
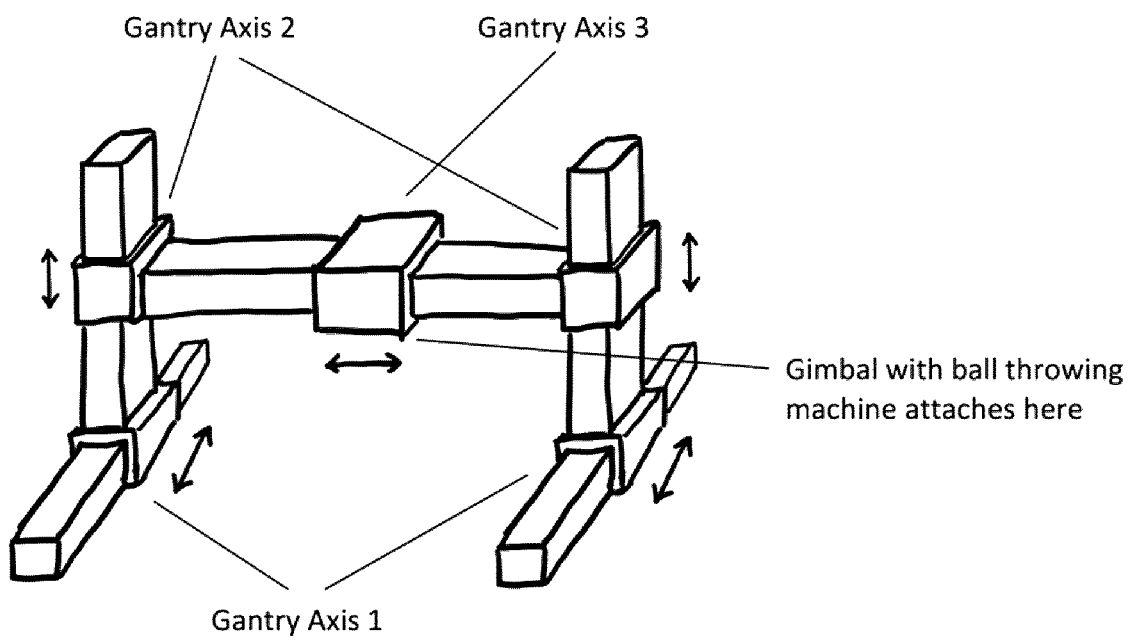
FIGS. 17a, 17b, 17c, 17d and 17e illustrate the gimbal and gantry system.
Figure 17B:
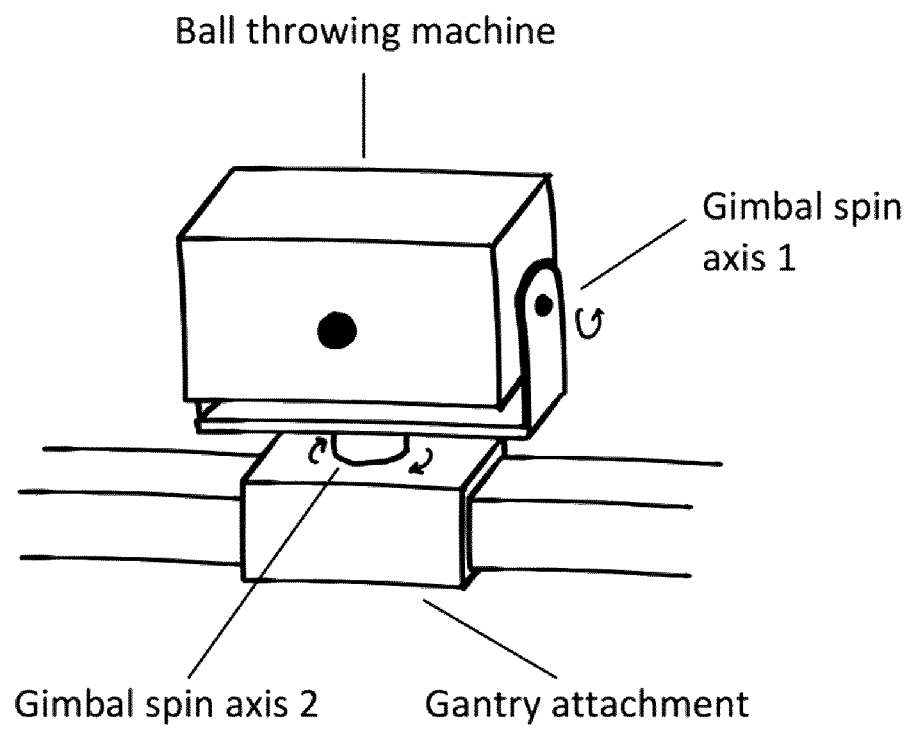
Figure 17C:
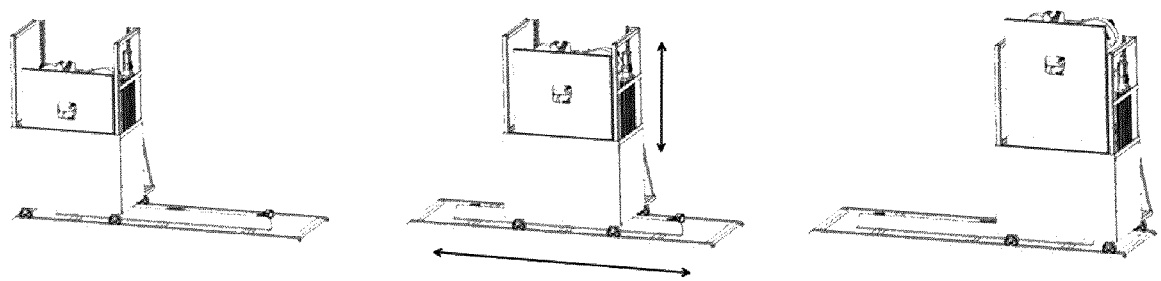
Figure 17D:
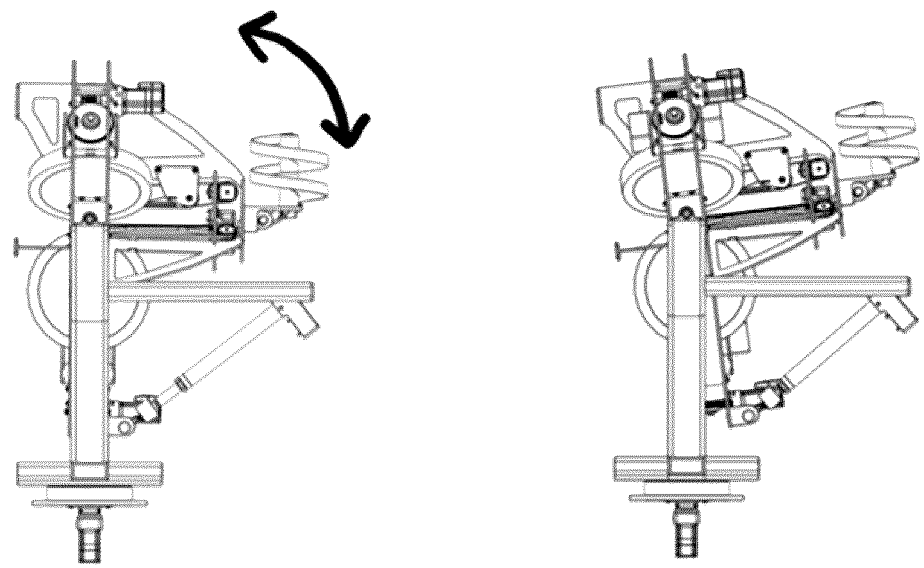
Figure 17E:
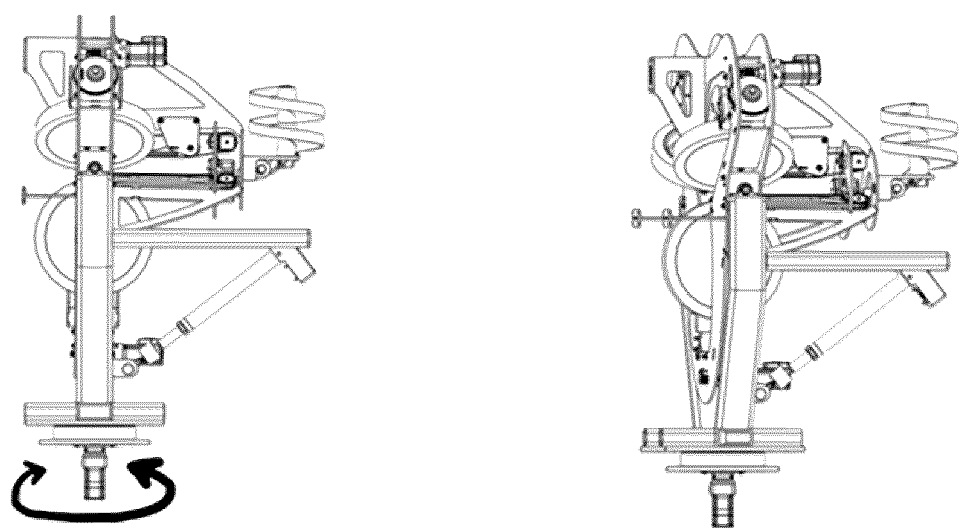

In a specific pitching machine embodiment, the position sensing devices 70 are embodied as cameras which are placed in known positions on the machine 11. FIG. 15 represents a configuration of cameras on a ball throwing machine. Markers 80, which are embodied as April tags are placed on known environmental features such as home plate, first base, and third base while the ball throwing machine is placed on the pitcher's mound. One example of the positioning of the markers 80 is illustrated in FIGS. 16*a* and 16*b*. When these markers are in view of the cameras or positioning sensing devices 70, the cameras obtain information about the relative position between the pitching machine and the markers. In one embodiment, stereoscopy is used to determine the distance from the cameras to the markers, while the position of the marker within the camera's image is used to determine the marker's position along the plane which is perpendicular to the camera's line of sight. The spatial model of the environment is embodied as the known coordinates of the markers in the environment's coordinate system. The processor correlates the positions of the markers as read by the cameras with the spatial model to determine which machine position best accounts for this observed data.

Upon obtaining an accurate measurement of the pitching machine's position and orientation in its environment, these parameters may be physically controlled such as by the actuators 76 and the actuator control unit 78. Control of the machine's position and orientation enables further control over the launch conditions of the ball towards the user (or player), to enable further control of the ball's trajectory. To control the machine's position and orientation, the machine localization and position orientation subsystem 28 provides an apparatus which is able to move the pitching machine translationally and rotationally.

FIGS. 17*a*-17*e* illustrate one embodiment of a gimbal and gantry system wherein the position of the ball throwing machine 11 is controlled by a one, two, or three-axis gantry, while the orientation of the machine is controlled by a gimbal. These may also be components of the machine localization and positioning control subsystem 28. In the present implementation, standard position motor control units, which may be seen as the actuator control unit 78, affect or affects the position of the gantry and the orientation of the gimbal. The control unit 78 which moves the gimbal and gantry include the actuators 76 of the machine localization and positioning control subsystem 28. Alternatively, the system could be implemented by a robotic arm or by another method or apparatus, whereby the actuators 76 physically move the system while being controlled by the actuator control unit 78.

Figure 18:
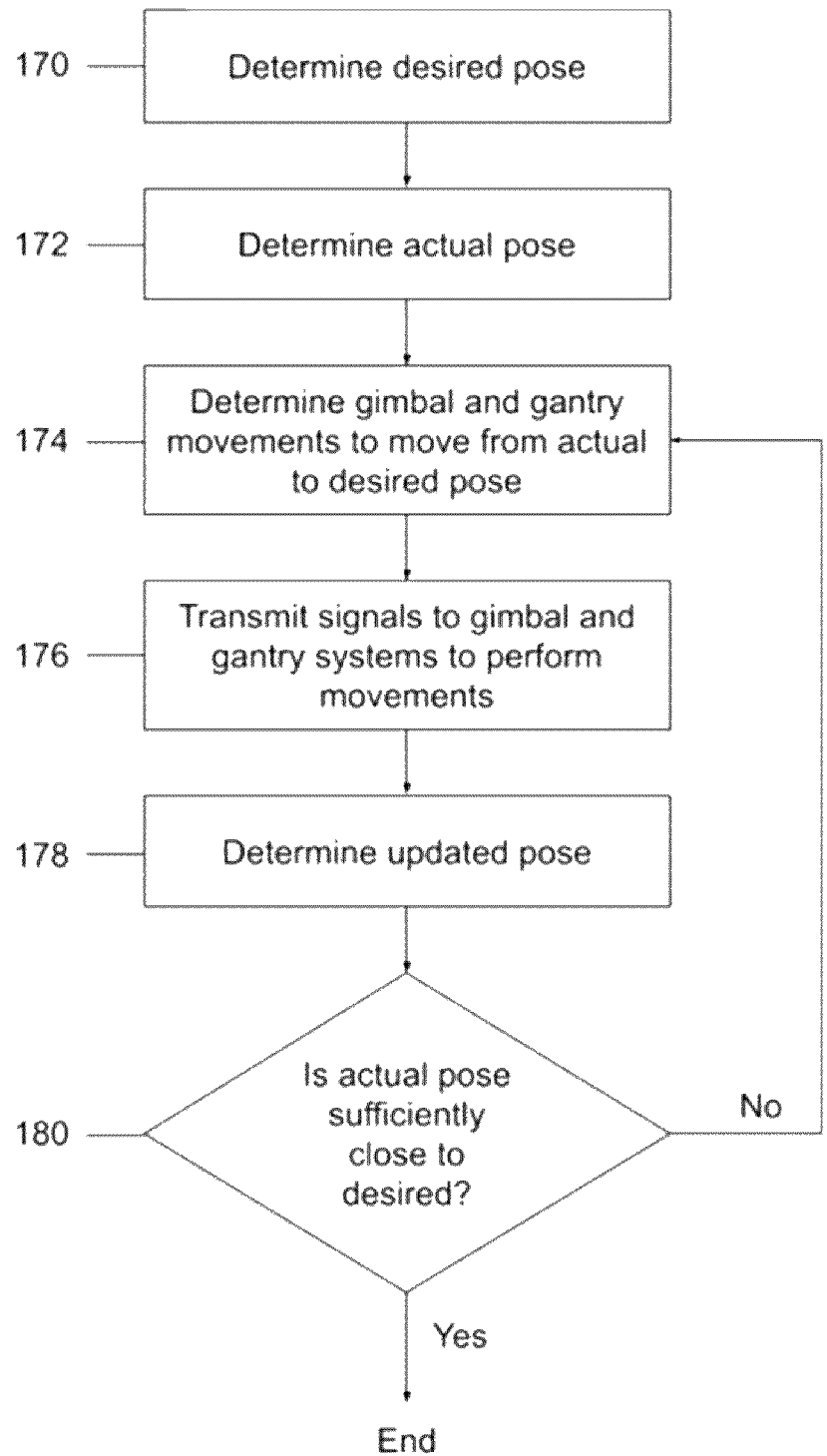
FIG. 18 shows the process of controlling the machine's pose.

In general, the localization subsystem 28 determines the actual pose of the throwing machine and receives a desired pose from a user. The change in pose to move from the actual to the desired pose is calculated by the processor. The desired pose may be inputted by the user or determined by inputs by the user. Motors on the gantry system then execute the required change in position while motors on the gimbal system execute the required change in orientation. The localization system 28 then checks that the actual pose is sufficiently close to the desired pose. If it is not, the system repeats this process. If it is, the process is complete. FIG. 18 illustrates an embodiment of the process described above.

As shown in FIG. 18, initially, the desired pose of the throwing machine is determined (170). The desired pose is determined based on the inputs from the user. The actual pose of the throwing machine is then determined (172). The required gimbal and gantry movements to move the machine from the actual pose to the desired pose are determined (174). This movements are then transmitted, such as in the form of signals, to the respective gimbal and gantry systems (176). The updated pose of the machine post movement is then determined (178). If the updated pose is deemed sufficiently close to the desired pose, the movement of the throwing machine may be seen as completed (180), but, if not, new gimbal and gantry movements are determined (174).

In another embodiment of the machine localization and position control subsystem, the machine can more simply be calibrated to a known start position in its environment. The localization system 28 can then move relative to its known and calibrated starting location using actuator control unit 78, actuators 76, and processor 74 to achieve position control. Sensors such as ultrasonic or inductive proximity sensors can further be added to this method of calibrating the machine to a known starting position in the environment. By calibrating the position of the machine to a location wherein these sensors give a known signal, this addition would allow the localization system 28 to recalibrate itself and determine the machine's position using the readings from these sensors.

With respect to the ball speed and spin control subsystem 22, while the ball orientation control system 24 and the machine position control system 28 control the position and orientation of the ball at launch, the ball's launch speed and spin may be controlled using the ball speed and spin control subsystem 22 and methods associated with the ball speed and spin control subsystem. The ball speed and spin control subsystem may also be part of the ball launch subsystem 20.

Figure 20B:
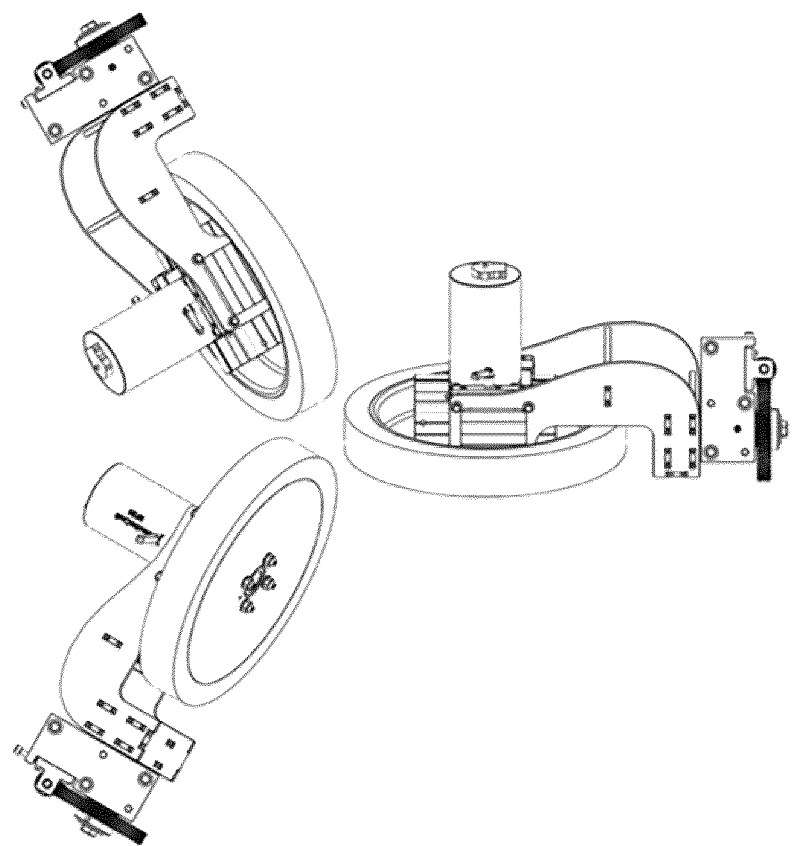
FIGS. 20a and 20b show the three-wheel system with varying alpha rotation angles.
Figure 20A:
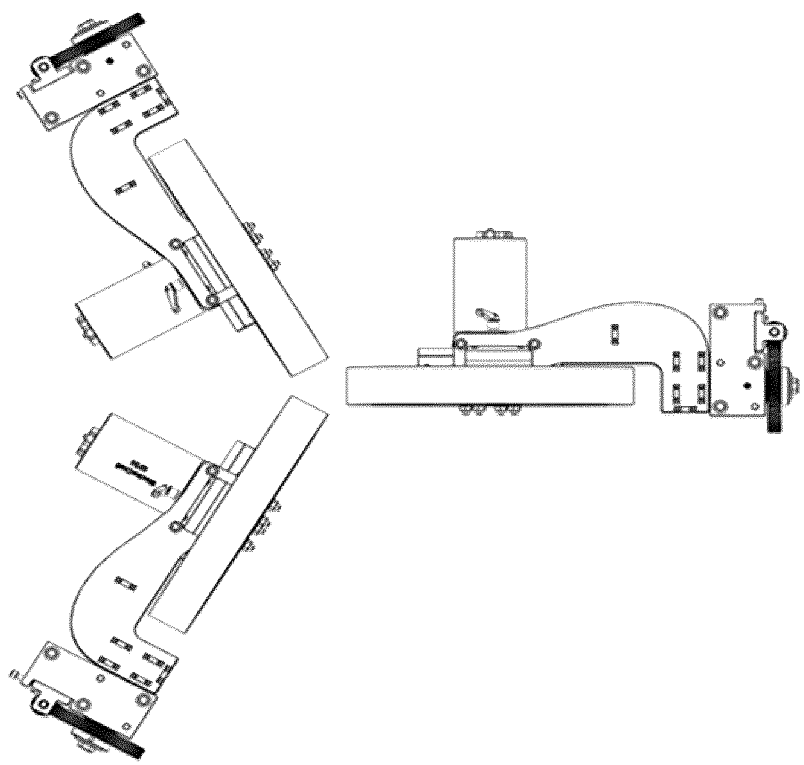

FIG. 19 illustrates a system capable of imparting 3D spin and arbitrary output velocity to a ball. The system includes a set of, preferably three (3), wheels, each of which is capable of spinning at independent rates. Each wheel is designed to rotate about the axis that is perpendicular to the ball's exit direction and the wheel's spin direction. This rotation may be referred to as alpha rotation. The three-wheel system is displayed in FIGS. 20a and 20b, with each figure showing the machine with different alpha rotation angles of the wheels. The three independent wheel speeds together impart an output velocity onto the ball, as well as top spin and side spin. The amount of alpha rotation, in conjunction with the wheel speeds, imparts a third dimension of spin, known as rifle spin, onto the ball. It is understood that the required launch conditions of the ball could be imparted via a wheel-based system, as in this embodiment, or via a robotic arm, pneumatic actuators, or the like.

In operation, the ball throwing machine 11, via the ball speed and spin control subsystem 22, imparts three dimensions of angular velocity onto the ball, as well imparting a one-dimensional linear velocity onto the ball when the ball is launched in accordance with the ball state specifications or ball launch instructions. The orientation of the ball throwing machine, as controlled by the systems described above, determines the direction of the ball's launch velocity. The three-dimensional orientation of the ball is controlled by the ball orientation control system described above, and finally the launch position is controlled via control of the machine's position by the position control system 28. Therefore, most or all components of the ball's launch state: position, orientation, velocity, and linear velocity may be controlled using the system of the disclosure.

With respect to the closed-loop control and error correction subsystem 30, this subsystem 30 may be used to assist in further controlling the state of ball at launch using the machine state to ball state mapping subsystem 33. The subsystem 30 may assist to provide error correction to the ball launch state in view of factors, such as, but not limited to machine wear, external environmental factors, and/or imperfect models of ball-machine interaction. Each of these factors may contribute to stochastic or systematic error with respect to a ball launch.

In one embodiment, use of the error correction subsystem 30 requires the ball state sensing subsystem 14 to be integrated with the ball throwing machine 11. Although ball tracking technology has been used in conjunction with ball throwing machines to evaluate the machines, in the current disclosure, the ball state sensing subsystem 14 is being used, in one aspect, for error correction. Methods of integrating ball state sensing into ball throwing machines for error correction and closed loop control, for the ultimate purpose of precise trajectory control, are hereby discussed.

An initial model for how the machine's state can be set to impart or generate a specific ball state is initially formulated. This model constitutes the initial state of the machine state to ball state mapping subsystem 33. The parameters of this model can be informed by experimental data, by theoretical physical models, or a combination thereof. In one embodiment, a theoretical physics model is developed to determine how the throwing machine's state results in or affects an output ball state. In an embodiment, some parameters of the initial model are made variable, and throughout the lifetime of the machine, the closed loop control system 30 updates these parameters to minimize or reduce error such as by either statistical regression or gradient descent. This process can be embodied in other ways. The machine state to ball state mapping subsystem 33 may be a bi-directional model which allows for both control of machine state given desired ball state and prediction of ball state given a machine state. It is also possible for the machine state to ball state mapping subsystem 33 to be unidirectional.

The ball state sensing system 14, either integrated into the machine or used in conjunction with it, is then used to detect the error in this model. When a ball is launched, the model determines the expected output ball state while the ball state subsystem 14 determines the actual output ball state, and the error is defined as the difference between the actual output ball state and the expected output ball state. The closed-loop control and error correction subsystem 30 then modifies the parameters of the initial model with the purpose of minimizing or reducing this error.

In the following example embodiment of the system, the disclosure is directed at a three-wheel machine baseball pitching machine that imparts a launch onto a baseball.

A theoretical model is developed to relate the wheel speeds and wheel angles to the ball's output speed and spin. An example of such a model is illustrated in FIG. 21.

As the machine is in operation and data of the expected and actual output ball states are recorded, the errors are stored in memory. Throughout operation, the parameters of the model are then re-fit to the data in a way that minimizes or reduces error. Use of this regression process provides an advantage for the current system over current ball throwing machines.

Figures 22, 23:
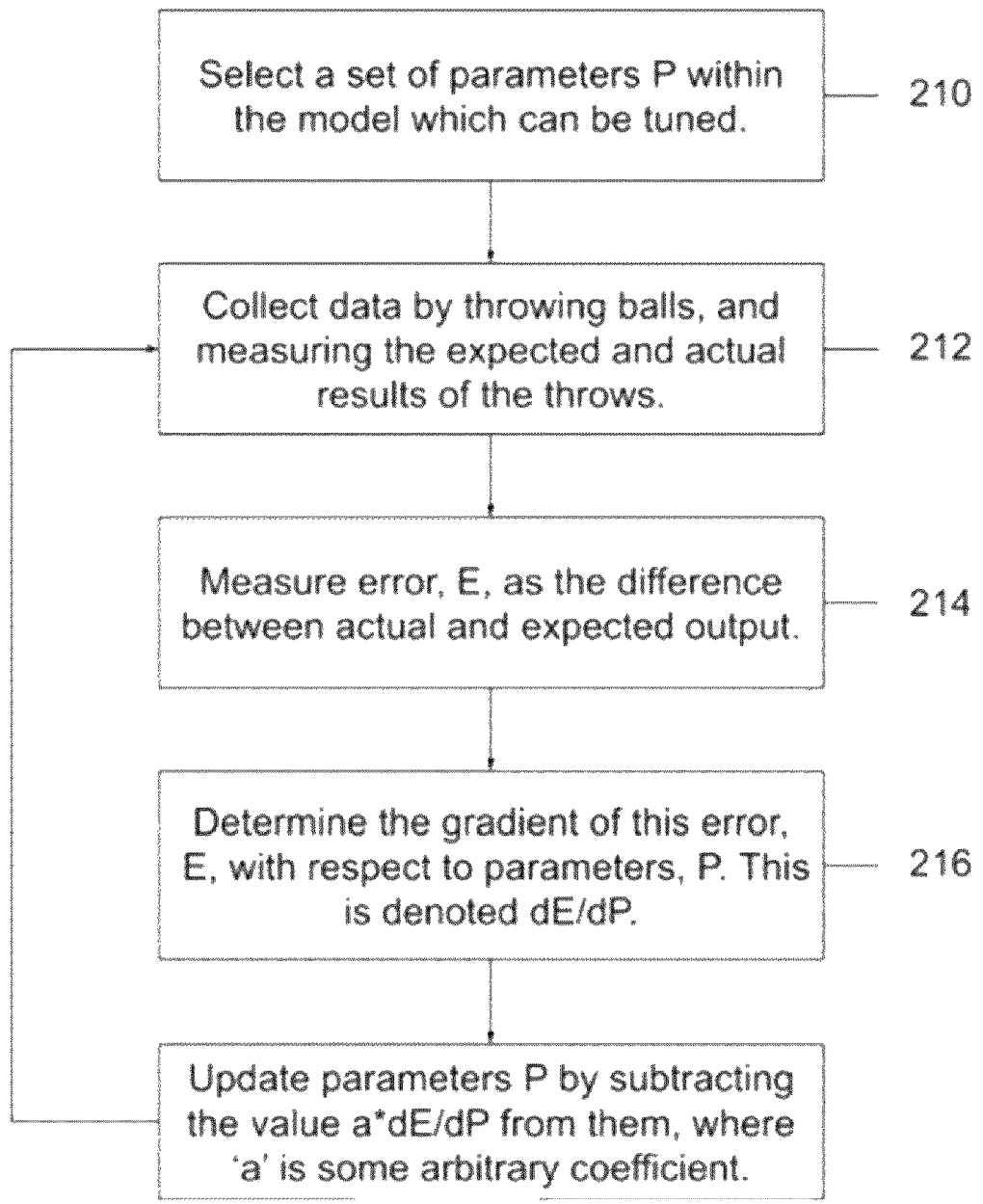
FIG. 22 illustrates the process of updating machine parameters using collected error data from past ball throws.
FIG. 23 shows a mathematical formulation of the machine parameter updates given collected error data.

In one embodiment, this may be accomplished by least-squares regression. Alternatively, this may also be determined by training a feed-forward neural network on the data, and continuously updating the parameters of the neural network by a gradient descent or other optimization techniques. FIG. 22 illustrates the process of updating machine parameters using collected error data from past ball throws. FIG. 23 shows a mathematical formulation of the process.

With respect to the flowchart of FIG. 22, initially, a set of tunable parameters, P, within the machine state to ball state mapping model 33 are selected (210). Data is then collected from the balls that are launched (212) such as by measuring the expected and actual results of ball throws of launches (214). An error, E, can then be calculated which may be seen as the difference between the actual output (ball states of actual ball throw) and the expected output (desired ball states of the ball throw). A gradient of the error is determined with respect to the parameters (216). This may be seen as dE/dP. Finally, the parameters, P, are updated by processing the parameters with the gradient of the error. For example, a value of b(dE/dP) may be subtracted from the parameters, P, where b is an arbitrary constant.

The ball state to trajectory subsystem 32 provides the functionality to map the output ball state and the resulting trajectory. One advantage of this functionality is to improve trajectory control.

A ball state to trajectory mapping generated by the ball state to trajectory subsystem 32 may predict the trajectory of a ball given its state, predict an instance of the ball's state given its trajectory, or any combination thereof. This mapping can take the form of an aerodynamic model of the ball's movement, a neural network, or other methods and can be determined theoretically using a physics model; can be fit to a set of observations of ball movement, as with a neural network; or some combination thereof. In one embodiment, a model relating ball state to trajectory is fit to many observations of the movement of balls. The mapping in one embodiment takes the form of a neural network, which accepts either the ball's state as input and outputs the ball's trajectory or takes the ball's trajectory as input and outputs the ball's launch state. The ball state to trajectory mapping generated by the ball state to trajectory subsystem 32 may be a bi-directional model. This subsystem may predict trajectory given a combination of ball state and environmental parameters. This subsystem may also predict ball state given a trajectory and any combination of ball state and environmental parameters. It is also possible for the ball state to trajectory mapping subsystem 32 to be unidirectional.

In one embodiment, a different model to relate the ball's state to its trajectory is learned for every different type of ball being used. Since this mapping is independent of the machine's state, it is also independent of machine wear and other factors and may therefore be more robust over time. One advantage of the current disclosure is that a model is learned once for each ball type and is rarely relearned.

With respect to the trajectory and ball launch selection interface 34, the interface allows users to select desired trajectories for a ball to be launched from the ball throwing machine. The interface facilitates a way for a user to specify desired components or characteristics of the ball that is being launched such as the ball's launch conditions, the path which it follows after launch, and the ball's appearance as it follows the launch path. As used herein, the term trajectory refers to any combination of the path that the ball follows after launch and the appearance of the ball as it follows the launch path. Several methods to implement such an interface are discussed.

In one embodiment, after receiving input from the user with respect to the desired characteristics to the ball launch, the interface 34 generates a trajectory in a virtual 3D space representing the trajectory to be replicated. The interface 34 may also generate the virtual trajectory by selecting previously tracked trajectories, such as those stored in a database. This database could be embodied as an external database containing trajectories of past tracked trajectories or simulated trajectories which the machine is capable of reproducing. These may then be displayed to the user, if desired. These examples of the interface 34 are not intended to limit the disclosure, or its potential applications or uses in any way. These included interfaces allow users to select control of the ball's output state, to select the parameters of the output path, to select previously tracked trajectories to replicate, and combinations thereof, for any given ball type.

In another embodiment, the trajectory selection interface 34 implements or performs the method of selecting trajectory parameters to control. This embodiment involves parametrizing the trajectory in a way that is comprehensible to the user and presenting these parameters to a user for selection.

Figure 24:
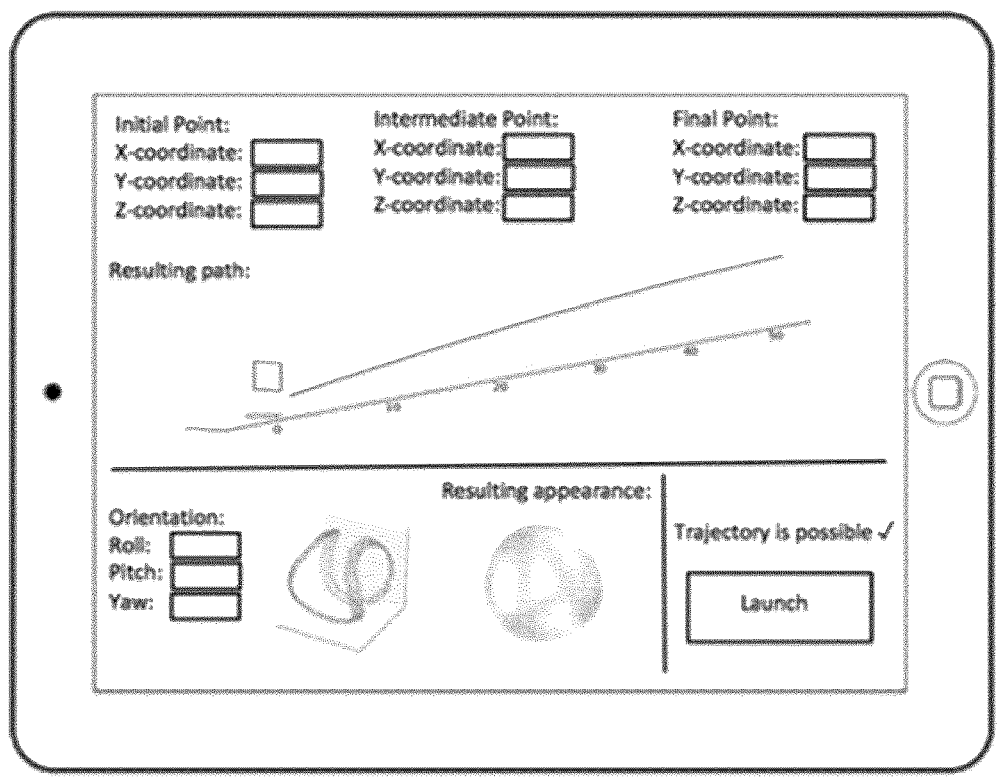
FIG. 24 illustrates an interface wherein users select the parameters of a ball trajectory to launch.

In one embodiment, these parameters can be presented to the user in a list or lists, or by selecting one after the other in separate stages. FIG. 24 illustrates an interface wherein the parameters which describe the trajectory includes three (3) points which the ball should pass through to specify its path, as well as an orientation which the ball should begin with to specify its appearance as it moves. In one embodiment, the three points may include a beginning point of the trajectory, an end point of the trajectory and a point along the trajectory path between the beginning and end points. It is understood that any number of points can be used. If insufficient data is provided to fully specify a trajectory, then one of the several trajectories which fits the specifications can be used.

If excessive input constraints are provided, there may be no trajectory that meets the specifications. In this case, either the user can be notified that their trajectory is invalid for a given ball type, or a more feasible trajectory with similar specifications can be used. In this example, the user specifies the three-dimensional coordinates of all three points as well as the roll, pitch, and yaw of the initial ball orientation. The planned trajectory is then displayed to the user before launch to be confirmed by the user.

Figure 27:
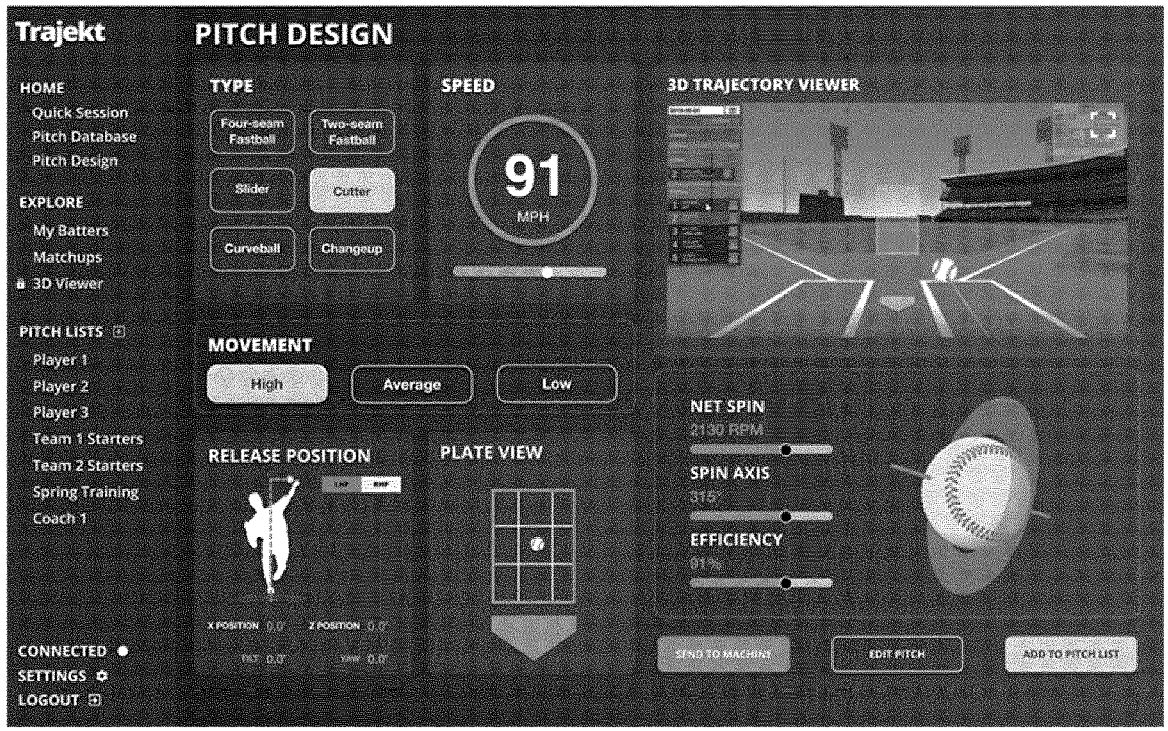
FIG. 27 illustrates an interface wherein users can input user can select various parameters including speed, spin rate, spin axis, release position, final position, and orientation.

Any parameter of the ball's launch, such as output speed and spin; any parameter of its path, such as position at a given time after launch; or any parameter of its appearance, such as the orientation of visual features of the ball as it follows its path, could constitute a parameter which could be selected as a part of the specification of the desired throw. FIG. 27 also shows an example of an interface wherein a user can select various parameters of the ball launch conditions to be produced. In this example, these parameters include but are not limited to speed, spin rate, spin axis, release position, final position, ball orientation and release angles (pitch and yaw, without limitation to roll). While the interface does not need to display any aspect of the trajectory to the user before launch, in the present embodiment, the path and appearance are independently displayed to the user. The entire trajectory can also be displayed to the user for confirmation by an animation of the ball as it travels through the trajectory.

Figure 25:
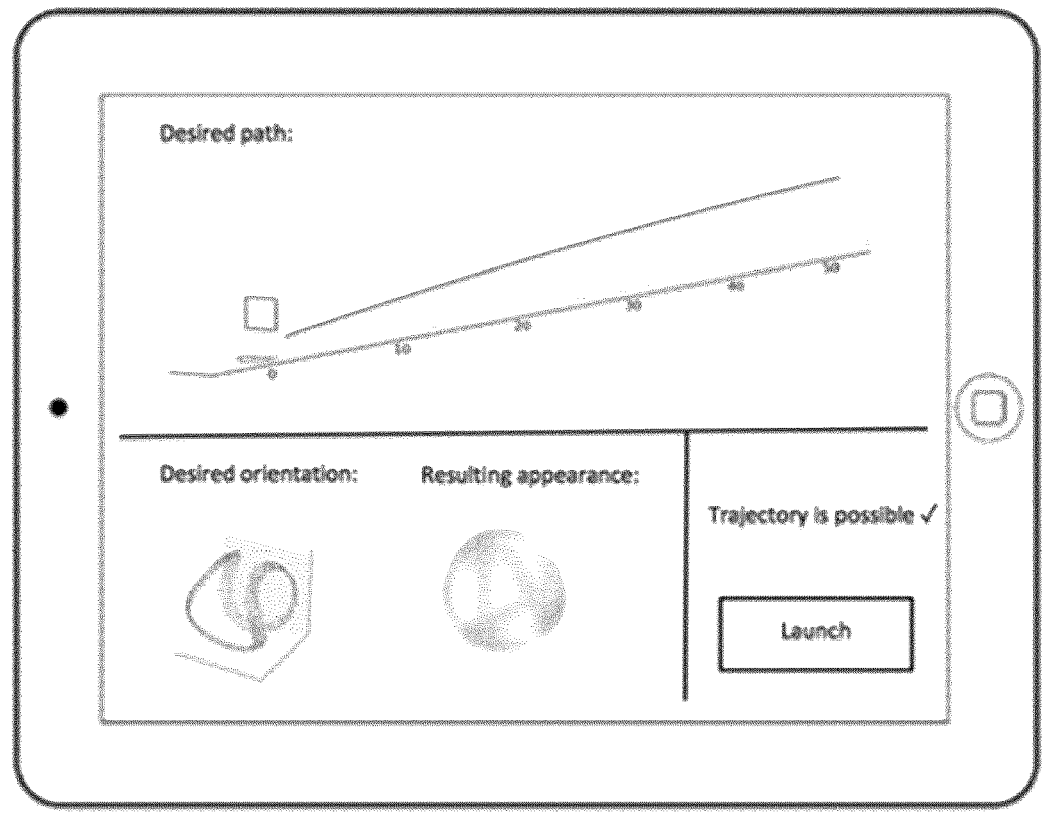
FIG. 25 illustrates an interface wherein users can create a trajectory in a virtual 3D space to be replicated.

In another embodiment of the trajectory selection interface 34, the user is provided with the functionality to simulate a trajectory within a virtual 3D space before selecting it to be launched by the ball throwing machine. In this example, a user can draw the path which they wish the ball to follow within a 3D input box, such as via a touch screen, stylus, mouse, touch pad, or the like. Multiple 2D windows into the 3D input can also be implemented for ease of use. The trajectory selection interface 34 also provides functionality for the user to visually control the desired appearance of the ball as it follows the specified path. This may be accomplished by allowing the user to move the input orientation of the ball and view the resulting ball appearance. A schematic diagram of the trajectory selection interface 34 for the current embodiment is illustrated in FIG. 25.

Figure 26A:
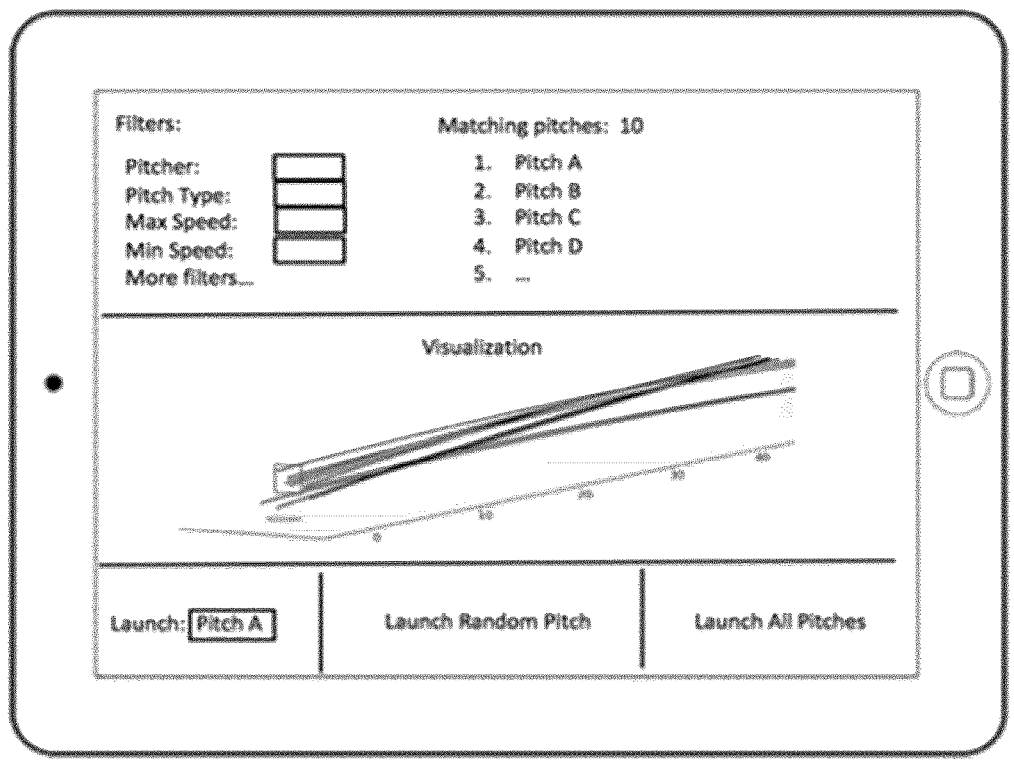
FIGS. 26a and 26b illustrate interfaces wherein users can select previously tracked trajectories to replicate.
Figure 26B:
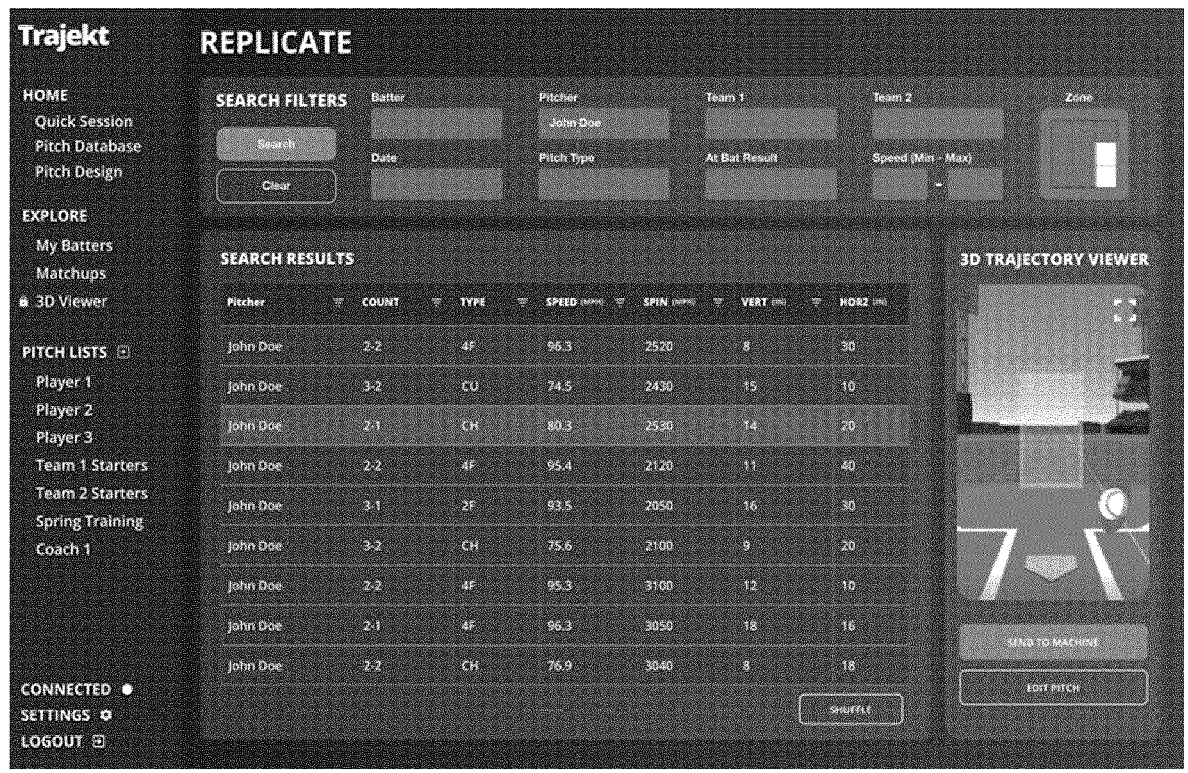

In a further embodiment, the trajectory selection interface 34 may provide the functionality for users to select previously tracked trajectories, or ball launches, to be replicated. In this embodiment, the interface 34 displays trajectories of previously tracked balls to the user. These may be stored in the database. In one example, the user could simply view the entire database and select past trajectories with which to launch the ball. The interface may also enable a user to select various parameters of the trajectory whereby the interface then searches the database for appropriate matches to the user selection. The user is then prompted to select from the subset of trajectories that match their search. Examples of search parameters include, but are not limited to the initial, intermediate, or final positions of the trajectory; the person, organization, or machine which created the trajectory; the time or date that the trajectory was tracked; and the velocity, angular velocity, or appearance of the trajectory at any point. In the present example, the user can select a single trajectory to launch, or can select a set of trajectories to be launched in any order or can select a set of trajectories from which a random trajectory can be launched. FIG. 26a illustrates an interface wherein users can select previously tracked trajectories to replicate. FIG. 26b illustrates an interface that enables users to filter a database of tracked trajectories for replication.

Figure 28:
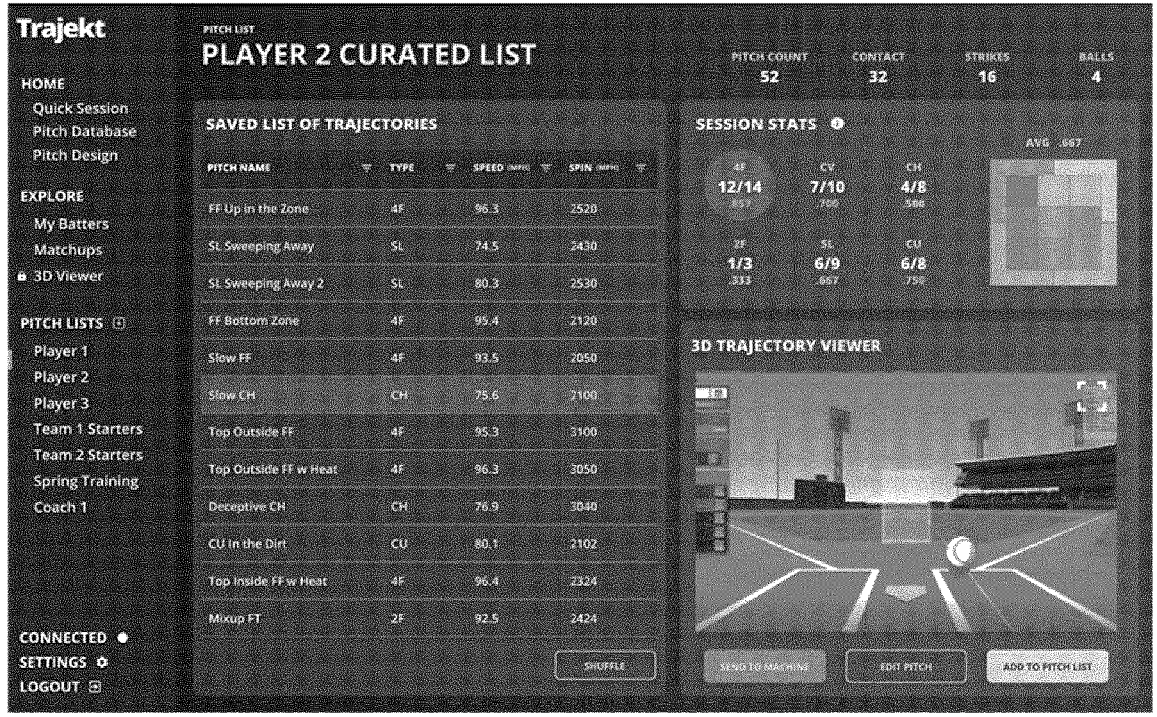
FIG. 28 illustrates a curated list of trajectories in the context of baseball training.
Figure 29:
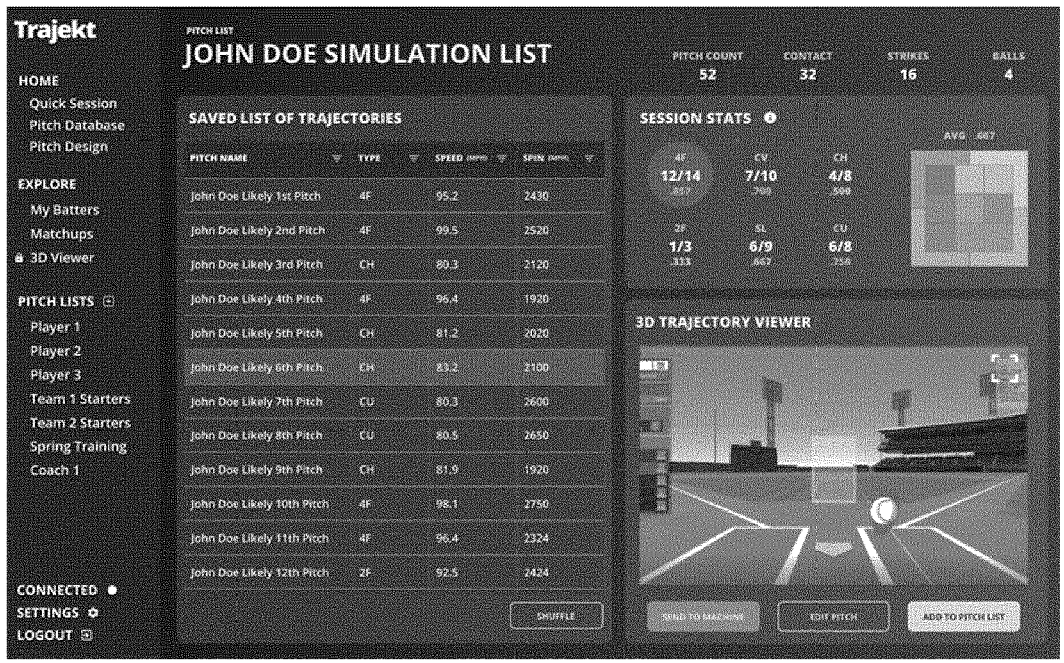
FIG. 29 illustrates a curated list of trajectories intended to simulate a set of trajectories which may be produced by a specific human.

The trajectory and ball launch interface can also provide the user the capacity to select a trajectory or trajectories from curated sets of trajectories. These curated sets of trajectories could either be manually or algorithmically generated for purposes including, but not limited to, simulating sets of trajectories which may be produced by a human (such as an opponent athlete) or to target specific improvements in the user's ability to interact with launched balls, or objects. FIG. 28 is a schematic screen shot illustrating a curated list of trajectories in the context of baseball training. The trajectories in this example can be curated for recreation, athletic training, or other purposes. FIG. 29 is a schematic screen shot illustrating a curated list of trajectories intended to simulate a set of trajectories which may be produced by a specific human in the specific context of baseball training.

Algorithmically generated lists can be achieved by aggregating simulated or past tracked pitches produced by a human under known conditions (i.e. in known game conditions, against known opponents, or other conditions) to simulate which are likely to be thrown in the future. Algorithmically generated lists can also be achieved by aggregating simulated or past tracked pitches which match a set of conditions in their trajectories. In one example, in the field of baseball, such an algorithm simulates a human pitcher by aggregating sets of their pitches in specific game conditions such as against specific batters, in specific pitch counts, or other conditions. In another example in the field of baseball, such an algorithm targets specific improvements in a batters ability by aggregating pitches which match conditions that a batter wishes to improve upon, such as specific pitch types (fastballs, curveballs, etc), specific locations around the strike zone, specific release positions, or other trajectory conditions or a combination thereof.

The result tracking subsystem 15 provides the user with the ability to track the outcome of their interactions with trajectories produced, or balls launched, by the system. The subsystem 15 may perform at least one of generating reports based on result of user interaction with one or more launched balls; generating analytics based on the result of user interaction with one or more launched balls or generating training recommendations based on the result of user interaction with one or more launched balls.

Figure 30A:
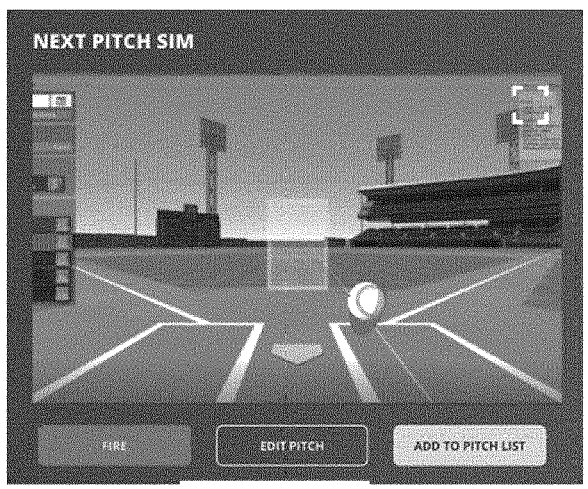
FIGS. 30a and 30b illustrates an example interface for manual result tracking.
Figure 30B:
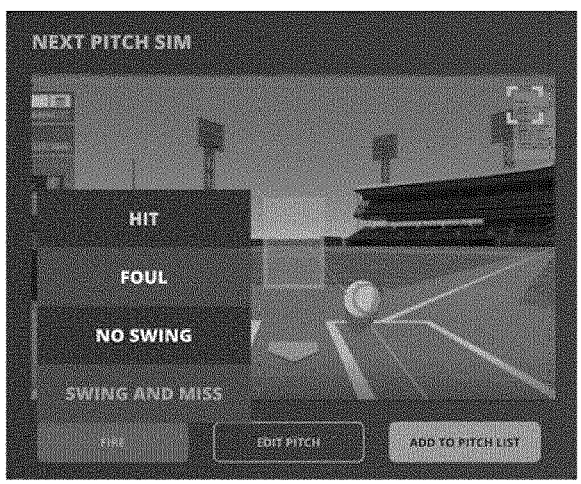

These interactions, or results, can be tracked either manually or by using external automated measurement systems. The results can then be stored in a database to allow for aggregation and analysis of results. The integration of result tracking with controlled trajectory interaction produced by the system 10 constitutes an improvement to the experience of using ball throwing machines. The interaction between the user and the produced trajectory (or launched ball) is tracked by a result tracking device 38 and stored in database 40, of the result tracking subsystem 15. The result tracking device can be embodied as any sensing device which measures the user's interaction with a produced trajectory or launched ball, such as the user's biomechanics when preparing to interact with the trajectory or launched ball, while interacting with it, and after interacting with it. It can also be embodied as a sensing device which measures what the result of the interaction of the user and the ball was (i.e. did the user hit or miss the ball and where did the ball go afterwards). Finally, it can be embodied as an interface which allows a human to input information about the result of the user's interaction with the trajectory. The result tracking system 15 can be integrated within the interface 13 or can be independent of this interface. In one embodiment of the result tracking subsystem, the interface 13 prompts a human to input the result of the ball interaction after a trajectory is produced from the machine. FIGS. 30a and 30b provide schematic screenshots of an implementation of this embodiment. FIG. 30a shows that a human can press a "Fire" button in the interface to prompt the machine to produce a selected trajectory or launched ball, and then afterwards a pop-up screen, schematically shown in FIG. 30b, prompts the human to input whether the ball was hit, missed, fouled, or not swung at by the user. This example is given in the specific context of baseball training. In this example, the result tracking subsystem 15 is within the interface 13, however automatic result tracking devices such as sensors would remove the requirement for a human to input the results and thereby remove the need for a human input method.

Figure 31:
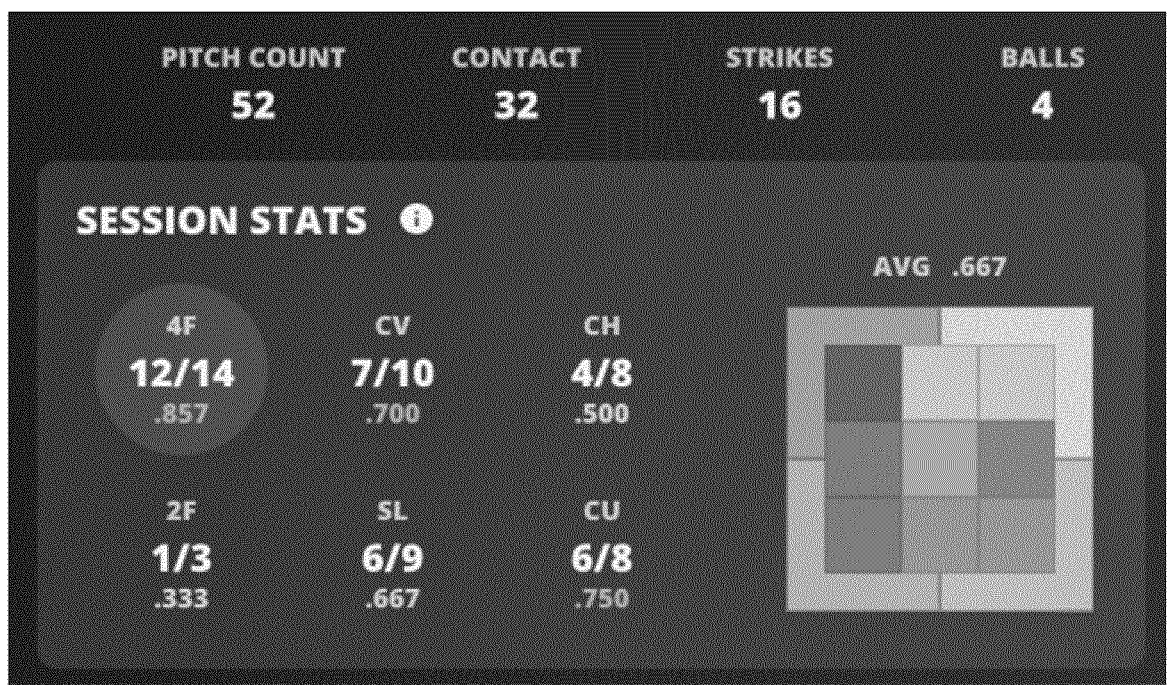
FIG. 31 shows an example interface of the result tracking subsystem.

The result tracking subsystem 15 also allows the system to improve the user's experience by providing the user with analysis on their usage of the machine and interaction with known ball trajectories. The result tracking interface 36 leverages the information from the result tracking subsystem 15 to show the user information related to their interaction with trajectories produced by the machine. In one embodiment, the result tracking interface 36 shows the user statistics about their interaction with trajectories in real time as they use the machine. FIG. 31 shows an example of such an interface in the context of baseball training wherein a user is shown the number of trajectories produced (pitch count) the number of trajectories they contacted with their bat, the number of trajectories they missed, as well as more information. This example also shows the user their batting average against pitches in various locations in the strike zone and their batting average against various pitch types. This interface is also capable of producing reports displaying information to the user on their interactions with the trajectories produced after having used the machine.

The result-tracking subsystem 15 may provide the functionality of tracking some or all of the ball launches in order to generate a set of analytics data or other information for further review or processing. In one embodiment, the subsystem 15 may track batter gameplay outcome (hit, foul, ball) against selected ball launch trajectories. Other embodiments of this subsystem may include tracking other criteria such as, but not limited to, human biomechanics (pre, during and post trajectory interaction); physical object interaction (e.g. bat-ball interaction tracking); and/or gameplay outcome. The result-tracking subsystem may use any combination of manual or automated sensing technology. This information is then stored in the user database.

Figure 3:
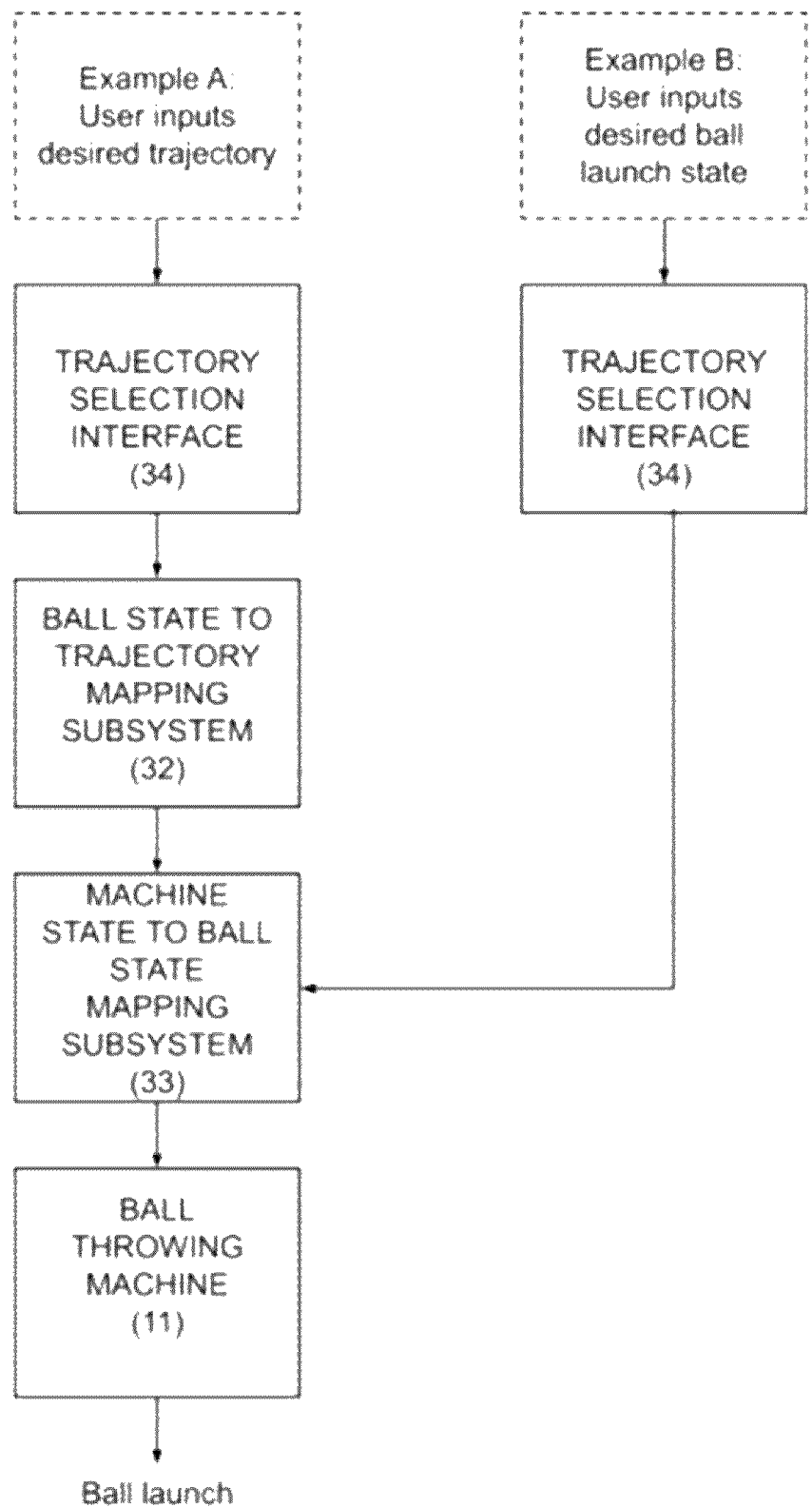
FIG. 3 is a flowchart outlining methods of subsystem communication given user input of desired trajectory or ball launch state.

Turning to FIG. 3, a flowchart of a method of subsystem communication given user input is provided. In one embodiment, the user interacts with the trajectory selection interface 34 to enter the parameters or characteristics of the desired trajectory or ball launch state. FIG. 3 contains two examples of how a user may select, input and/or determine the desired ball launch output. Both example methods make use of the trajectory selection interface 34, which enables the user to specify the desired features of ball launch when it is thrown from the ball throwing machine 11. In one example, this may include at least one of selecting the ball's path after release, selecting the appearance of the ball throughout its path, selecting the ball's launch conditions outlined above. These parameters or characteristics can either be selected directly from the interface 34 or a database trajectory can be selected to be replicated such as disclosed above.

In one method (seen in FIG. 3, Example A), the user submits trajectory specifications via the trajectory selection interface 34 which are received by the system 10. The system then processes the trajectory specifications (either via processor 26 or a processor within the controller (not shown)) via the ball state to trajectory mapping subsystem 32 to determine or generate ball launch state specifications to have the launched ball follow the desired specifications as inputted or selected by the user. These ball launch state specifications are then transmitted by the machine state to ball state mapping subsystem to inform the ball throwing machine 11 of how to configure itself to produce the required ball launch. The configured and oriented ball is then launched by the ball throwing machine (or ball launch subsystem). Alternatively, in another method (seen in FIG. 3, Example B), the user directly inputs the ball launch state specifications into the trajectory selection interface 34 and these ball launch state specifications are then transmitted to ball throwing machine 11 via the machine state to ball state mapping subsystem.

Figure 2:
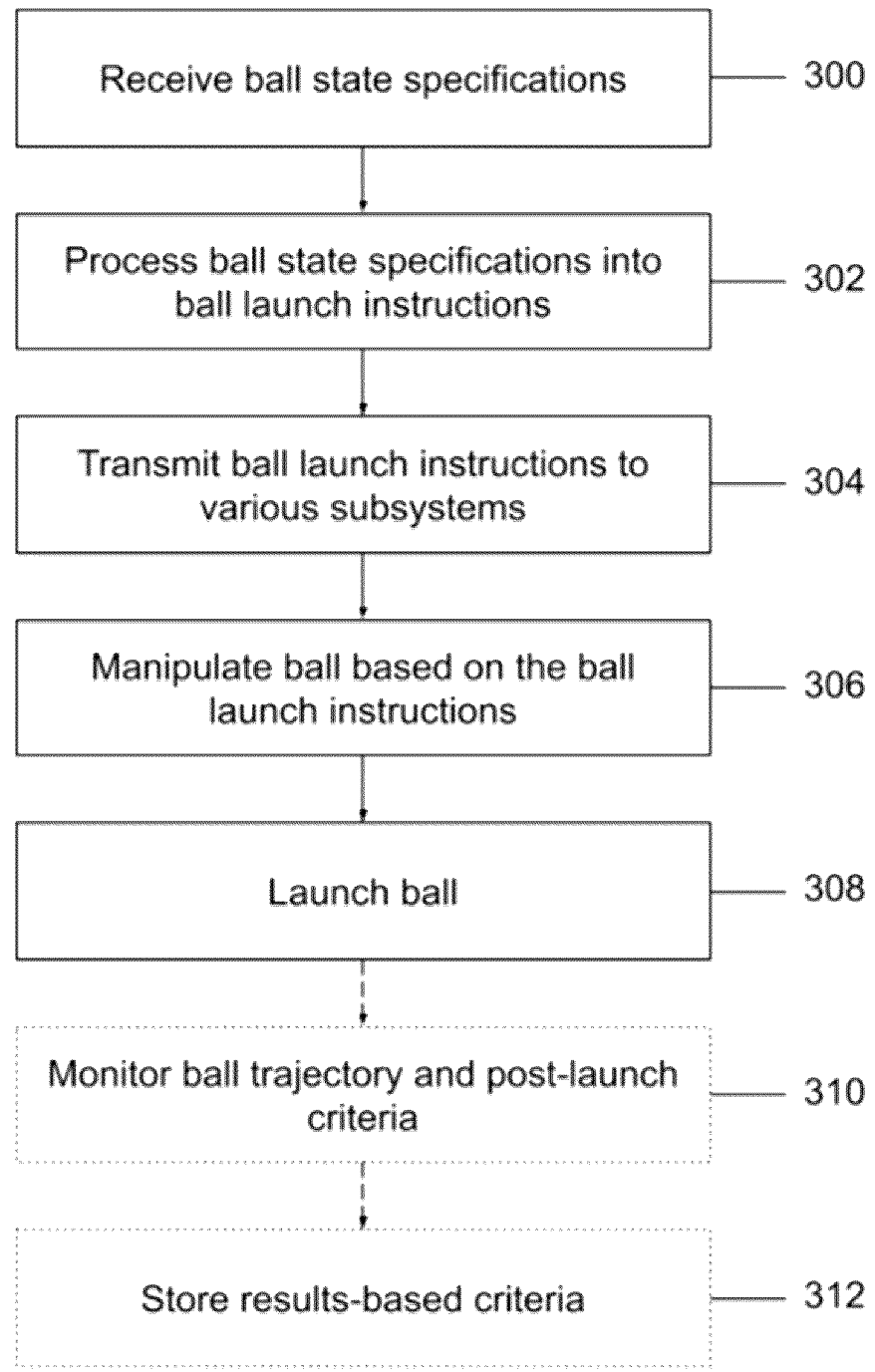
FIG. 2 is a flowchart outlining a method of ball launch instruction.
Figure 4:
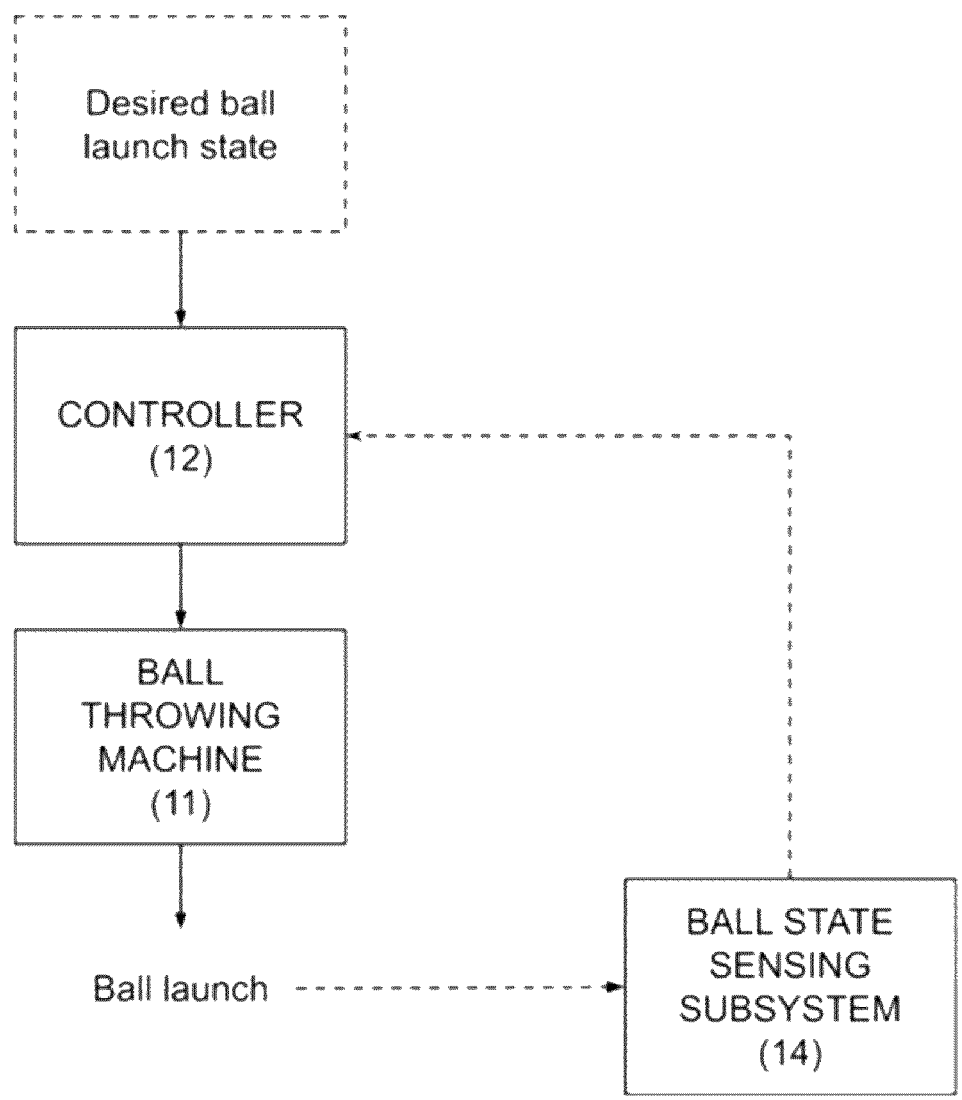
FIG. 4 is a flowchart outlining a method of subsystem communication for closed loop control of ball launch.

Turning to FIG. 2, a flowchart outlining a method of launching a ball is shown. FIG. 4 illustrates the subsystem communications for such a method within the present embodiment. After receiving the ball state specifications, trajectory specifications, or input (300) from a user, such as via the trajectory selection interface 34, the specifications are processed into ball launch instructions (which include the machine's target state) by the controller 12 (302). These ball launch instructions are then transmitted to the various subsystems (304) of the apparatus via the controller 12 in order to prepare a ball for launch based on the ball state specifications.

The ball that is to be thrown is then manipulated by the system according to the ball launch instructions, which preferably include trajectory information (306). For example, the ball orientation control subsystem 24 may receive ball launch instructions and then manipulate a ball from the source to orient the ball in a desired orientation such as disclosed above. The machine localization and position control subsystem may also receive ball launch instructions and re-orient the machine based on the ball launch instructions. The ball speed and spin control subsystem 22 may also receive ball launch instructions to understand the required speed and spin to impart onto the ball as it is launched.

The ball is then launched (308) via the ball launching subsystem with assistance from the ball speed spin control subsystem 22.

If desired, the ball trajectory and other post-launch criteria may be monitored (310), such as discussed above in order to provide error correction to the system or to store trajectories in the database for selection in the future. Furthermore, other results-based criteria maybe stored in the system (312) to be displayed to the user via the result tracking interface 36.

Figure 5:
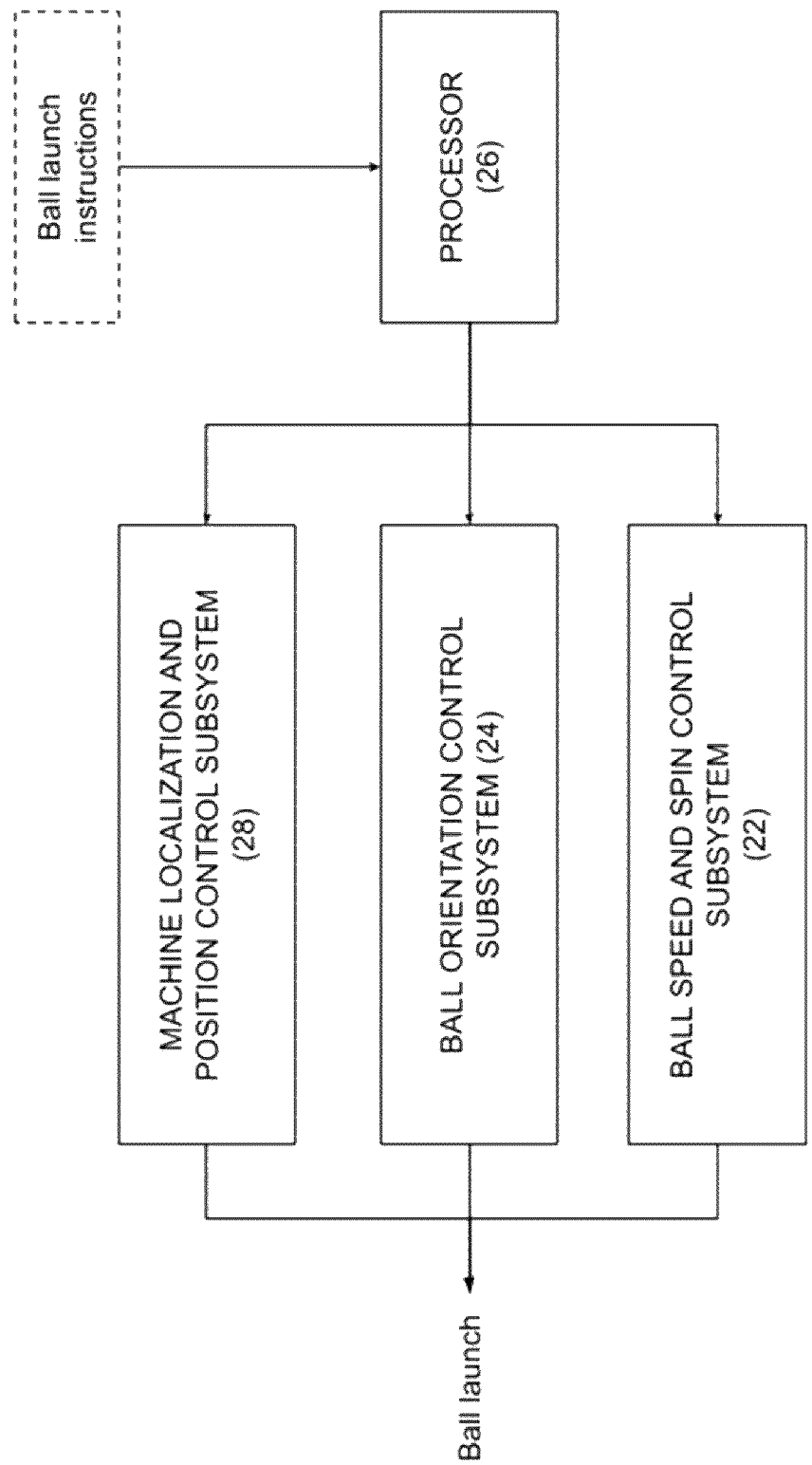
FIG. 5 is a flowchart outlining a method of subsystem communication for executing ball launch instructions.

FIG. 5 is directed to another method of performing a ball launch where the ball launch is based on the machine state specifications received by the controller. The ball throwing machine 11 receives the ball launch instructions and produces a machine state with the desired specifications. After receiving the ball state specifications or user input, the system processes the ball state, or ball launch, specification or specifications to generate signals for transmission to the ball throwing machine which may be seen as ball launch instructions.

In one embodiment, the ball launch control system includes the closed-loop control and error correction system 30 which determines the required machine parameters to impart the desired launch conditions. After determining the machine parameters for enabling the ball to be launched according to the ball state specifications, these parameters are transmitted to the processor 26 via the set of ball launch instructions.

After the ball is launched by the machine, the ball state sensing subsystem 14 may measure the actual output (ball launch) and update itself to correct any errors that may arise.

The physical components of the machine, as depicted in FIG. 4, then actualize the required machine parameters, or ball launch instructions, specified by the close-loop control system 30. In operation, the pitching machine 11 uses the localization and positioning system 28 to physically move and orient itself in the required, or desired, manner. After orienting in the pitching position, the pitching machine, or system, then receives a ball, whereby the ball orientation control system 24 reorients the ball into a desired orientation. The ball speed and spin control system 22 then imparts the required speed and spin onto the ball as it is launched.

As outlined above, the ball state detection system 14 may also be used to detect and control the orientation of a ball that is received by the pitching machine such that it may have a dual functionality. As outlined above, the ball state detection system (14 may also determine the state of the ball upon launch to inform the close-loop control system 30.

The presented configuration of these subsystems constitutes only one way that the described system can be embodied. This example is not meant to limit the potential embodiments of such a system, nor is it intended to limit any of the possible uses or applications of the components described. Each component may have uses independent of that which they are used for in the system above. Furthermore, a whole ball throwing system may be implemented using a subset or a rearrangement of the components described above.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

We claim:

1. A system for replicating ball trajectories comprising:
   a ball throwing machine including:
   a ball state sensing apparatus;
   a ball orientation control apparatus;
   a machine localization and position control apparatus; and
   a ball speed and spin control apparatus;
   a controller for controlling the ball throwing machine, wherein the controller includes:
   a machine state to ball release state subsystem or a ball state to trajectory mapping subsystem or a combination thereof;
   an interface associated with the controller for a user to enter ball launch inputs representing a ball release state or trajectory to be produced by the ball throwing machine; and
   a closed-loop control and error correction subsystem, wherein the closed-loop control and error correction subsystem updates the machine state to ball release state subsystem or the ball state to trajectory mapping subsystem of a combination thereof to correct a next ball launch based on machine learning algorithms using statistical regression, gradient descent calculations or other optimization methods; and
   a processing unit.

2. The system of claim 1 further comprising a results tracking apparatus.

3. The system of claim 1 wherein the ball state sensing apparatus comprises:
   a set of cameras; and
   a set of sensors.

4. The system of claim 3 wherein the ball state sensing apparatus further comprises a set of measuring devices.

5. The system of claim 1 wherein the ball orientation control apparatus comprises:
   a conveyor system; and
   a motor control unit for controlling the conveyor system.

6. The system of claim 5 wherein the ball orientation apparatus further comprises a set of tensioners.

7. The system of claim 1 wherein the machine localization and position control apparatus comprises:
   a set of position sensing devices;
   a set of actuators; and
   an actuation unit.

8. The system of claim 7 wherein the machine localization and position control apparatus further comprises:
   a motion control system.

9. A method of automated object throwing comprising:
   receiving user input to a ball throwing machine;
   processing the user input to generate object launch instructions, the object launch instructions including trajectory characteristics of a trajectory path or ball launch conditions for a launched object, the trajectory characteristics including a beginning point of the trajectory path, an end point of the trajectory path and the ball launch conditions including at least one of speed, spin rate, spin axis, release position, final position, ball orientation and release angles;
   performing the object launch instructions to prepare the object for launching;
   launching the object with the ball throwing machine;
   monitoring object trajectory post launch;
   comparing object trajectory post launch with expected object trajectory; and
   performing error correction based on the comparing object trajectory post launch with expected object trajectory for a next launch by the ball throwing machine by updating a machine state to ball release state subsystem or a ball state to trajectory mapping subsystem of a combination thereof, the error correction based on machine learning algorithms using statistical regression, gradient descent or other optimization method calculations.

10. The method of claim 9 wherein performing the object launch instructions to prepare the object for launching comprises:
    re-orienting the object from an actual orientation to a desired orientation based on the object launch instructions.

11. The method of claim 9 wherein performing the object launch instructions to prepare the object for launching comprises:
    re-orienting an object launching machine from an actual pose to a desired pose based on the object launch instructions.

12. The method of claim 9 wherein performing the object launch instructions to prepare the object for launching comprises:
    preparing the object to be launched at at least one of a required speed; a required spin; a required orientation and a required release position based on the ball launch instructions.

13. A method of training a user comprising:
    performing a method of automated object throwing as claimed in claim 9;
    tracking user interaction with launched object; and
    storing result of user interaction in a database.

14. The method of claim 13 further comprising at least one of generating reports based on result of user interaction; generating analytics based on the result of user interaction or generating training recommendations based on the result of user interaction.

15. The system of claim 1 further comprising:
    an apparatus for algorithmically generating trajectories to simulate predetermined criteria for selection by a user via the interface.

16. The system of claim 1 further comprising:
    an apparatus for a user to curate sets of trajectories.

17. The method of claim 12 further comprising:
    launching the ball at the at least one of required speed; a required speed; a required spin; a required orientation and a required release position.

18. The method of claim 9 wherein the trajectory characteristics further comprise at least one point on the trajectory path between the beginning and end points.

* * * * *

UNITED STATES PATENT AND TRADEMARK OFFICE
CERTIFICATE OF CORRECTION

PATENT NO. : 12,201,888 B2
APPLICATION NO. : 17/606809
DATED : January 21, 2025
INVENTOR(S) : Rowan William Ferrabee, Joshua Scott Pope and Robert Wilson Rowland It is certified that error appears in the above-identified patent and that said Letters Patent is hereby corrected as shown below:

In the Drawings

In Figure 21, equation $V_{Y3} = R\ W_2\ \cos\alpha_2 = -V_y - r\omega_2\sin a_3 - r\omega_2\cos a_3$ has been replaced with equation $V_{Y3} = R\ W_2\ \cos\alpha_2 = -V_y + r\omega_2\sin a_3 - r\omega_2\cos a_3$ Signed and Sealed this
Fifteenth Day of July, 2025

Coke Morgan Stewart
*Acting Director of the United States Patent and Trademark Office*